United States Patent
de Bijl et al.

(10) Patent No.: US 9,061,612 B2
(45) Date of Patent: Jun. 23, 2015

(54) SAFETY BELT SYSTEM IN TRANSPORT VEHICLES FOR ABLE AND DISABLED PEOPLE

(75) Inventors: Sjoerd Hendrik de Bijl, Velddriel (NL); Marcel Johannes Hendrikus Schouten, Velddriel (NL)

(73) Assignee: BEHEERS-EN BELEGGINGSMAATSCHAPPIJ VERACHTERT B.V., Velddriel (NL)

( * ) Notice: Subject to any disclaimer, the term of this patent is extended or adjusted under 35 U.S.C. 154(b) by 2 days.

(21) Appl. No.: 13/618,864

(22) Filed: Sep. 14, 2012

(65) Prior Publication Data
US 2013/0088060 A1  Apr. 11, 2013

(30) Foreign Application Priority Data

Sep. 15, 2011  (NL) .................................... 1039037

(51) Int. Cl.
| | |
|---|---|
| *B60N 2/30* | (2006.01) |
| *B60R 22/00* | (2006.01) |
| *A61G 3/08* | (2006.01) |
| *B60N 2/68* | (2006.01) |

(Continued)

(52) U.S. Cl.
CPC . *B60N 2/30* (2013.01); *B60R 22/00* (2013.01); *A61G 3/0808* (2013.01); *B60N 2/688* (2013.01); *B60N 2/245* (2013.01); *B60N 2/3006* (2013.01);
(Continued)

(58) Field of Classification Search
CPC .. B60N 2/3043; B60N 2/3045; B60N 2/3047; B60N 2/305; B60R 22/24; B60R 22/22
USPC .................. 297/14, 331, 335, 483, 378.1; 296/65.05, 65.09, 68.1, 69.04, 69.13; 410/7, 9, 10, 12, 23
See application file for complete search history.

(56) References Cited

U.S. PATENT DOCUMENTS

| | | | | |
|---|---|---|---|---|
| 4,265,478 A | * | 5/1981 | Korsgaard | .................. 296/65.04 |
| 4,455,046 A | * | 6/1984 | Linderoth | .................... 296/68.1 |

(Continued)

FOREIGN PATENT DOCUMENTS

| | | | | |
|---|---|---|---|---|
| DE | 3837170 A | * | 5/1990 | ............. B60R 22/25 |
| DE | 195 44 014 | | 5/1997 | |

(Continued)

OTHER PUBLICATIONS

Extended European Search Report dated Nov. 22, 2012 issued to related European application No. EP 12 18 4591.

(Continued)

*Primary Examiner* — David R Dunn
*Assistant Examiner* — Jody Giacoman
(74) *Attorney, Agent, or Firm* — Knobbe, Martens, Olson & Bear, LLP

(57) ABSTRACT

A device suitable for use in a transport vehicle of able people and/or people in a wheelchair is described. The device includes a foot support with a foot attachment for attachment to a vehicle floor and a rigid arm having a shoulder end and a foot end. The rigid arm is connected near the foot end to the foot support. The system also includes a safety-belt system including a safety-belt and safety-belt attachment. The safety-belt attachment has a first attachment point with belt-guiding situated near the shoulder end of the rigid arm. The rigid arm is attached to the foot support by one or more arm hinges. The rigid arm is capable of rotating around the arm hinges. In addition, a foldable chair may be mounted on the foot support. The foot support may be connected with the vehicle floor using a connector which fits in a rail in the floor.

16 Claims, 33 Drawing Sheets

(51) Int. Cl.
  *B60N 2/24* (2006.01)
  *B60N 2/28* (2006.01)
  *B60R 22/18* (2006.01)
  B60R 22/22 (2006.01)
  B60R 22/26 (2006.01)

(52) U.S. Cl.
  CPC ............ *B60N 2/3011* (2013.01); *B60N 2/3034* (2013.01); *B60N 2/3043* (2013.01); *B60N 2/24* (2013.01); *B60N 2/2887* (2013.01); *B60N 2/3018* (2013.01); *B60R 22/18* (2013.01); *B60R 22/22* (2013.01); *B60R 22/26* (2013.01)

(56) References Cited

U.S. PATENT DOCUMENTS 6,015,186 A    1/2000  Grieger
6,837,666 B1 * 1/2005  Panzarella et al. ............ 414/462
7,854,576 B2 * 12/2010 Girardin et al. ................ 410/9
8,414,234 B2 * 4/2013  Girardin et al. ................ 410/7
8,911,188 B1 * 12/2014 Mill ................................ 410/23

FOREIGN PATENT DOCUMENTS

DE        10038035 A1 *  3/2001  ............. B60N 2/30
DE    20 2010 001 972     6/2011
EP         1 680 302       5/2008
WO    WO 2005047053 A1 *  5/2005  ............. B60N 2/24

OTHER PUBLICATIONS

Search Report dated Sep. 15, 2011 issued to priority Dutch patent application No. NP 1039037.

* cited by examiner

SAFETY BELT SYSTEM IN TRANSPORT VEHICLES FOR ABLE AND DISABLED PEOPLE

TECHNICAL FIELD

The invention pertains to the technical field of vehicles and vehicle accessories intended for transporting people. In particular, the present invention relates to a device comprising a foot support, a rigid arm and a safety-belt system which can be used in a transport vehicle for both able people and people in a wheelchair. Thereto, the device may also comprise a foldable chair.

BACKGROUND

When transporting a person in a wheelchair, it is usually necessary to transport both the person and the wheelchair, such that when the destination is reached, the person can use his own wheelchair and does not rely on the presence of another wheelchair at the destination. There are basically two ways in which one can transport a disabled person and his wheelchair. The first one is where the person occupies a seat in the transport vehicle and the wheelchair is transported separately, e.g. in the boot of the vehicle. Hereby, the wheelchair may be folded, but would still occupy a lot of space in the vehicle which cannot be used for transporting other people, luggage or goods. Furthermore, the problem of helping the disabled person out of his wheelchair and into a normal passenger seat may be hard to overcome, especially if an assisting person is not able to lift the disabled person.

The second manner in which one can transport both the disabled person and his wheelchair, is by transporting the person in his wheelchair. Hereby, the person in a wheelchair can be assisted to enter the vehicle by means of e.g. a ramp or small elevator. The wheelchair is subsequently secured to the vehicle and the disabled person himself is secured into his wheelchair. It is clear that for this way of transporting disabled people, the problems of the first way are circumvented, i.e. the wheelchair does not occupy as much extra space, and the disabled person does not need to be lifted out of his wheelchair into a passenger seat. The present invention relates to the second manner of transport.

However, transporting the disabled person in his wheelchair gives rise to other problems. Firstly, there needs to be enough space in the vehicle to accommodate the person in his wheelchair. This means that at least some space in the vehicle is not occupied by a normal passenger seat. One solution to this problem is to simply remove one or more passenger seats from the vehicle, thereby creating the necessary space for the wheelchair. However, this means that these passenger seats are lost during the whole trip. If, for instance, the trip involves transporting one or more disabled people to the hospital and transporting one or more able people from the hospital to their homes, the able people may not occupy the space used for transporting the disabled people and multiple trips may be necessary. To overcome this, it is possible to install foldable passenger seats in the vehicle. These seats can accommodate able people for transport, and may be folded up, thereby giving room to disabled people in a wheelchair.

European patent EP 1 680 302 discloses and claims a device constructed as a fold-in, swing aside chair, also called folding chair or fold-up chair, for placement onto a special applied floor in transport vehicles, such as mini busses, city busses, touring cars, ambulances, trains, trams, airplanes and such, wherein in its length the back support of the foldup chair is supplied with a head support, wherein the back support can be folded down hingeably over the seat element to a practically horizontal position, wherein in the normal sitting position the chair shape is maintained by locks, wherein the fold-up chair is foldable over two mutual perpendicular not in the same horizontal plane situated axis of rotation into a suitable vertical position of the whole fold-up chair, wherein the first axis of rotation is situated between the back support and the seat element and the second axis of rotation is situated eccentrically lengthwise beneath the seat element, wherein blocking is done around the mentioned first axis of rotation by means of a first locking mechanism and around the mentioned second axis of rotation by means of a second locking mechanism, wherein in the mentioned extended vertical position the fold-up chair is spring loaded, wherein the foot support of the fold-up chair is constructed as rigid vertical beams hingeably mounted to the seat element, wherein the material of the supporting framework of the dismountable fold-up chair is a strong rigid material, whereby in the vertical position the fold-up chair due to its rotation about the second axis is in a lowered position near the vehicles bottom, so that it is coupled torsionally stiff around the second axis and it is also detachable from the horizontal surface of the floor plate attached to the bottom plate of the transport vehicle. A safety-belt system can be attached to the seat.

Placing one or more chairs such as disclosed in European patent EP 1 680 302 in a vehicle can solve the problem of transporting both able and disabled people at the same time, whereby in subsequent trips, when the number of able and/or disabled people changes, there is no need for removing or adding a passenger seat from or to the vehicle: a seat can simply be folded or unfolded depending on whether the seating space is used by a disabled or an able person, respectively. However, there remains the problem of securing the able and/or disabled passenger.

Transporting both able people and people in a wheelchair using the same vehicle poses serious difficulties in securing the passengers. Able people can sit down in a chair and be secured with a safety-belt system e.g. a three-point safety-belt system. When transporting people in a wheelchair, care has to be taken to secure both the wheelchair and the person sitting in it using a wheelchair-fastening system and a safety-belt system respectively. Since people in a wheelchair usually sit lower to the ground then people sitting a vehicle chair or passenger seat, and since a wheelchair is usually wider than a vehicle seat, it is not always possible to accommodate both able and disabled people with the same securement system. European patent EP 1 680 302 does not disclose a safety-belt system which can be used both when the seat is in a folded and in an unfolded position. Furthermore, employing a safety-belt system which can be used by both able and disabled passengers improves the equality and/or feeling of equality between able and disabled passengers.

European patent EP 1 701 860 discloses and claims a device constructed as floor plate or floor and which consists of rail section and floor section parts and is fastened on the bottom plate of transport vehicles, such as vehicles with load floors for conversion to mini busses, according to the strict rules applicable for passenger transport up to 8 people, ambulances, trains, busses, trams, airplanes and such, in which on the mentioned floor plate or floor chairs/seats and wheelchairs are attachable, in which the mentioned fastening to the bottom plate can be done in a mechanical as well as a chemical way, in which the rail and floor section parts are applied in a longitudinal direction of the transport vehicle, in which the mentioned chairs/seats can be coupled, mostly without tools in a so called chair track on the mentioned rail section parts, wherein on each chair-track the chairs/seats can be coupled to a single rail section part, in which the mentioned rail section part has a continuous narrow slit on the upper side to internally form a mechanical strong U-shape with beveled flanges, in which the material of the rail- and floor section parts is a rigid and ductile material with a relatively high bending and shear strength, in which the mentioned U-shape of the mentioned rail section part is provided with relatively thick sides to absorb extreme intermittent load, in which rail and floor section parts are mechanically interlockable and the floor can be fastened at the top side of the corrugated section of the bottom plate of the transport vehicle, whereby the beveled flanges are provided with a serration with a short pitch on the inside for form-matching receipt of special T-headed bolts for fastening the base plates of the chairs/seats, in which fastening or locking of the mentioned T-headed bolt in the floor is done with an instrument provided with a lever, in which in the floor section parts special coverable recesses are applied in a suitable pattern for retractors with ratchet construction and common retractors of securing belts for fastening wheelchairs.

Combining the inventions disclosed in European patent applications EP 1 680 302 and EP 1 701 860 leads to system for transporting both able and disabled people without the necessity of removing seats. However, one of the shortcomings of such a system would be that two separate safety systems are needed at every place where both able and disabled people are meant to be seated. This means that more material is used, leading to extra costs. In particular, two different safety belts are needed, one of which—the one intended for a person in a wheelchair—cannot be easily integrated into the vehicle wall or into the fold-up chair, since the folded chair may obstruct a comfortable and safe use of such a safety-belt system. Furthermore, an extra safety belt may be easily lost or stolen and/or may become dirty during storage, which could lead to undesired stains on passenger's clothes.

Prior art documents do not seem to disclose safety-belt systems which, in combination with easily handled fold-up chairs, can safely secure both able and disabled persons and which are completely integrated into the vehicle or vehicle chairs, thereby improving comfort of the passenger, improving ease of use, and reducing the material used. Therefore, there remains a need in the art for an improved, safety-ensuring device which can be used by both able and disabled people in a transport vehicle. The present invention aims to disclose an improved device which solves at least some of the abovementioned problems. Hereby, the device comprises a rigid arm which is used in combination with a safety-belt system, e.g. a three-point safety belt system, whereby the rigid arm provides a fixed attachment point around shoulder height for the safety belt system. This rigid arm is hingeably attached to the vehicle or to the foot support to which also a fold-up chair may be mounted and can be turned into the desired position. When the chair is unfolded, the rigid arm may be fixed into an essentially upright position. When the chair is folded, the rigid arm can be turned in a position which is tilted with respect to the vehicle wall. Thereby, the position of the attachment point at shoulder height can be lowered and further away from the vehicle wall, such a position being more comfortable and secure when the same safety belt is used to secure a person in a wheelchair which is usually in a seating position lower to the vehicle floor and further away from the vehicle wall than an person sitting in an unfolded passenger seat.

SUMMARY OF THE INVENTION

The present invention provides a device suitable for use in a transport vehicle of able people and/or people in a wheelchair, comprising:

- a foot support comprising foot attachment means for attachment to a vehicle floor;
- a rigid arm having a shoulder end and a foot end, said rigid arm connected near said foot end to said foot support;
- a safety-belt system comprising a safety-belt and safety-belt attachment means, whereby said safety-belt attachment means comprise a first attachment point with belt-guiding means situated near the shoulder end of said rigid arm, characterized in that said rigid arm is attached to said foot support by means of one or more arm hinges, whereby said rigid arm is capable of rotating around said arm hinges.

In an embodiment, said arm hinges define an axis around which said rigid arm is capable of rotating an essentially upright position and a tilted position when said rigid arm is unlocked.

In an embodiment, said device comprises arm blocking means defining a maximum tilting angle between said essentially upright position and said tilted position, whereby said maximum tilting angle is smaller than 45°, preferably smaller than 20°, more preferably smaller than 15°, and larger than 1°, preferably larger than 5°, more preferably larger than 8°, most preferably around 10°.

In an embodiment, said device comprises arm locking means for fixing said rigid arm in an essentially upright position.

In an embodiment, said device comprises a foldable chair comprising a seat element attached to said foot support with chair attachment means, and a back support attached to said seat element with back attachment means, said chair capable of being folded between an unfolded position suitable for transport of an able person and a folded position suitable for transport of a person in a wheelchair, whereby said chair in said unfolded position comprises a proximal side near said rigid arm in said essentially upright position and an opposite distal side.

In a preferred embodiment, said foldable chair further comprises a head support, a second locking mechanism and a third locking mechanism. In a more preferred embodiment, said chair attachment means comprise one or more seat hinges and a mechanical actuator for holding the seat element in either said folded position or in a seating position, said seat hinges defining a first axis around which said seat element is capable of rotating with respect to said foot support between a seating position and a folded position, said first axis preferably lying essentially horizontal and along the proximal side of the chair. In a more preferred embodiment, said back support is connected to said seat element by means of one or more back hinges; said back hinges defining a second axis around which said back support is capable of rotating when it is unlocked between said seating position and said unfolded position. In a more preferred embodiment, said first axis and said second axis are mutually perpendicular and not in the same plane situated. In a more preferred embodiment, the chair comprises a seating lock mechanism for locking the back support in a position where the back support is folded onto the seat element. In a more preferred embodiment, the device comprises a back support locking mechanism for fixing the back support in an unfolded position. In a more preferred embodiment, the chair comprises a head support comprising one or more bars, which is connected to said back support by means of said bars which can slide along sliding means attached to said back support, and whereby said head support can slide between an extended position and a bottom position. In a more preferred embodiment, the chair comprises a transfer mechanism capable of transferring a force from the head support to the back support locking mechanism for unlocking the back support from said unfolded position.

In an embodiment, the rigid arm comprises a shape which is wider in the longitudinal direction of the vehicle near said foot end and/or near said arm hinges than near said shoulder end.

In an embodiment, said device comprises a connector for attaching said foot support to a vehicle floor. In a preferred embodiment, said connector comprises a sledge, a T-bolt-like profiled clamping member and a clamping actuator. In a more preferred embodiment, the clamping actuator is placed on the sledge and is capable of lifting the T-bolt-like profiled clamping member such that the connector is clamped with the T-bolt-like profiled clamping member to the vehicle floor, preferably to a rail with U-shaped cross section and/or overhanging edges in said vehicle floor. In a more preferred embodiment, the sledge comprises a frame and two profiled plates, each of which is capable of rotating around a preferably essentially longitudinal pivot axis which is fixed with respect to the frame. In a more preferred embodiment, the T-bolt-like profiled clamping member comprises a slab-like upper part and a preferably flatiron-like lower part comprising essentially straight side edges and a peak-shaped front and/or back end, whereby the lower part of said T-bolt-like profiled clamping member comprises upstanding side faces which are at least partly slanted with respect to the slides of the slab-like upper part of said T-bolt-like profiled clamping member. In a more preferred embodiment, the clamping actuator comprises a spindle, a spindle frame and a lifting frame. In a particularly preferred embodiment, the slab-like upper part of the T-bolt-like profiled clamping member is introduced through an essentially rectangular hole in the bottom of the spindle frame, whereby preferably the T-bolt-like profiled clamping member is restrained from moving in the longitudinal direction by the front/back side of the hole in the bottom of the spindle frame; and preferably the T-bolt-like profiled clamping member is attached to the lifting frame, preferably by an essentially cylindrical pivot bar whereby the pivot bar is inserted in a transverse hole through an upper end of the slab-like upper part of the T-bolt-like profiled clamping member and rests in slanted slits along the sides of the lifting frame, whereby the lifting frame is capable of moving along the longitudinal direction with respect to the spindle frame and the spindle is introduced through the spindle frame and the lifting frame in a longitudinal direction such that turning the spindle results in a longitudinal movement of the lifting frame with respect to the spindle frame, thereby moving said pivot bar upwards or downwards since it follows the slanted slits in the lifting frame's sides.

In an embodiment, said safety-belt attachment means of said device comprise a second attachment point near said foot end of said rigid arm at the proximal side of said chair, said safety-belt system comprising a fastening device glideably connected to said safety belt with belt-guiding means, whereby said safety-belt attachment means comprise a third attachment point, situated at the distal side of said seat element, whereby said fastening device fits a first fastening counterpart connected to said third attachment point of said safety-belt attachment means. In a preferred embodiment, said safety-belt attachment means of said device comprise a fourth attachment point, connected to said vehicle floor, whereby a second fastening counterpart of said fastening device is connected to said fourth attachment point.

In an embodiment, the first attachment point is located between 50 cm and 150 cm from the vehicle floor, preferably higher than 60 cm, more preferably higher than 70 cm, even more preferably higher than 80 cm, but lower than 140 cm, more preferably lower than 130 cm, even more preferably lower than 120 cm from the vehicle floor, most preferably between 80 cm and 90 cm from the vehicle floor.

In a second aspect, the present invention provides a foldable chair comprising a seat element and a back support suitable for use in a device as described in this document.

In a third aspect, the present invention provides a connector for attaching a foot support to a vehicle floor, suitable for use in a device as described in this document.

In a fourth aspect, the present invention provides a system comprising a device as described in this document and a floor comprising a rail in an essentially longitudinal direction, whereby the connector of said device is capable of connecting the foot support to said floor along said rail.

In a further aspect, the present invention provides the use of a device as described in this document, a foldable chair as described in this document, a connector as described in this document and/or a system as described in this document in a vehicle for transporting one or more able passengers, one or more disabled passengers, or a combination of both able and disabled passengers.

In an embodiment, the foldable chair further comprises a seat element, a back support, a head support, a first locking mechanism, a second locking mechanism and a third locking mechanism, whereby said seat element is connected to said foot support by means of one or more seat hinges; said seat hinges defining a first axis around which said seat element can rotate when it is unlocked between a seating position to a folded position, said first axis preferably lying essentially horizontal and along the proximal side of the chair;

whereby said first locking mechanism can fix said seat element into said seating position;

whereby said back support is connected to said seat element by means of one or more back hinges; said back hinges defining a second axis around which said back support can rotate when it is unlocked between said seating position and said unfolded position;

whereby said first locking mechanism is unlocked when said back support is in said seating position;

whereby said second locking mechanism can fix said back support into said unfolded position;

whereby said first axis and said second axis are mutually perpendicular and not in the same plane situated;

whereby said head support is connected to said back support by means of one or more bars which can slide along sliding means attached to said back support, and whereby said head support can slide between an extended position and a bottom position;

whereby said third locking mechanism can fix said head support into said extended position;

whereby said second locking mechanism is unlocked when said head support is into said bottom position.

In an embodiment, the rigid arm comprises a cavity, whereby said safety belt is guided through said cavity, said safety belt entering and/or exiting said cavity near said shoulder end and near a foot end of said rigid arm.

In an embodiment, the vehicle floor comprises a built-in chair-track which stretches along the longitudinal direction of the vehicle. In a preferred embodiment, the foot support comprises T-head-like attaching means at its bottom, and whereby said foot support can be attached to the vehicle floor by introducing said T-head-like attaching means into said chair-track and clamping said T-head-like attaching means in a fixed position along said chair-track by means of nuts or quick connectors.

In an embodiment, the foot support comprises one or more upstanding beams.

Therefore, the present invention provides, but is not limited to:

1. A device suitable for use in a transport vehicle of able people and/or people in a wheelchair, comprising:
    a foot support comprising foot attachment means for attachment to a vehicle floor;
    a rigid arm having a shoulder end and a foot end, said rigid arm connected near said foot end to said foot support;
    a safety-belt system comprising a safety-belt and safety-belt attachment means, whereby said safety-belt attachment means comprise a first attachment point with belt-guiding means situated near the shoulder end of said rigid arm,
    characterized in that said rigid arm is attached to said foot support by means of one or more arm hinges, whereby said rigid arm is capable of rotating around said arm hinges.
2. A device according to point 1, whereby said arm hinges define an axis around which said rigid arm is capable of rotating between an essentially upright position and a tilted position when said rigid arm is unlocked.
3. A device according to point 2, comprising arm blocking means defining a maximum tilting angle between said essentially upright position and said tilted position, whereby said maximum tilting angle is smaller than 45°, preferably smaller than 20°, more preferably smaller than 15°, and larger than 1°, preferably larger than 5°, more preferably larger than 8°, most preferably around 10°.
4. A device according to any of points 1 to 3, comprising arm locking means for fixing said rigid arm in an essentially upright position.
5. A device according to any of points 1 to 4, comprising a foldable chair comprising a seat element attached to said foot support with chair attachment means, and a back support attached to said seat element with back attachment means, said chair capable of being folded between an unfolded position suitable for transport of an able person and a folded position suitable for transport of a person in a wheelchair, whereby said chair in said unfolded position comprises a proximal side near said rigid arm in said essentially upright position and an opposite distal side.
6. A device according to point 5, whereby said foldable chair further comprises a head support, a second locking mechanism and a third locking mechanism,
    whereby said chair attachment means comprise one or more seat hinges and a mechanical actuator for holding the seat element in either said folded position or in a seating position, said seat hinges defining a first axis around which said seat element is capable of rotating with respect to said foot support between a seating position and a folded position, said first axis preferably lying essentially horizontal and along the proximal side of the chair;
    whereby said back support is connected to said seat element by means of one or more back hinges; said back hinges defining a second axis around which said back support is capable of rotating when it is unlocked between said seating position and said unfolded position;
    whereby said first axis and said second axis are mutually perpendicular and not in the same plane situated;
    whereby the chair comprises a seating lock mechanism for locking the back support in a position where the back support is folded onto the seat element;
    whereby the device comprises a back support locking mechanism for fixing the back support in an unfolded position;
    whereby the chair comprises a head support comprising one or more bars, which is connected to said back support by means of said bars which can slide along sliding means attached to said back support, and whereby said head support can slide between an extended position and a bottom position.
    whereby the chair comprises a transfer mechanism capable of transferring a force from the head support to the back support locking mechanism for unlocking the back support from said unfolded position.
7. A device according to any of points 1 to 6, whereby the rigid arm comprises a shape which is wider in the longitudinal direction with respect to the vehicle in which the device can be installed near said foot end and/or near said arm hinges than near said shoulder end.
8. A device according to any of points 1 to 7, comprising a connector for attaching said foot support to a vehicle floor.
9. A device according to point 8, whereby the connector comprises a sledge, a T-bolt-like profiled clamping member and a clamping actuator
    whereby the clamping actuator is placed on the sledge and is capable of lifting the T-bolt-like profiled clamping member such that the connector is clamped with the T-bolt-like profiled clamping member to the vehicle floor, preferably to a rail with U-shaped cross section and/or overhanging edges in said vehicle floor;
    whereby the sledge comprises a frame and two profiled plates, each of which is capable of rotating around a preferably essentially longitudinal pivot axis which is fixed with respect to the frame;
    whereby the T-bolt-like profiled clamping member comprises a slab-like upper part and a flatiron-like lower part comprising essentially straight side edges and a peak-shaped front and/or back end, whereby the lower part of said T-bolt-like profiled clamping member comprises upstanding side faces which are at least partly slanted with respect to the slides of the slab-like upper part of said T-bolt-like profiled clamping member;
    whereby the clamping actuator comprises a spindle, a spindle frame and a lifting frame,
    whereby the slab-like upper part of the T-bolt-like profiled clamping member is introduced through an essentially rectangular hole in the bottom of the spindle frame, whereby preferably the T-bolt-like profiled clamping member is restrained from moving in the longitudinal direction by the front/back side of the hole in the bottom of the spindle frame; and
    whereby the T-bolt-like profiled clamping member is attached to the lifting frame, preferably by an essentially cylindrical pivot bar whereby the pivot bar is inserted in a transverse hole through an upper end of the slab-like upper part of the T-bolt-like profiled clamping member and rests in slanted slits along the sides of the lifting frame, whereby the lifting frame is capable of moving along the longitudinal direction with respect to the spindle frame and the spindle is introduced through the spindle frame and the lifting frame in a longitudinal direction such that turning the spindle results in a longitudinal movement of the lifting frame with respect to the spindle frame, thereby moving said pivot bar upwards or downwards since it follows the slanted slits in the lifting frame's sides.

10. A device according to any of the points 6 to 9, whereby said safety-belt attachment means comprise a second attachment point near said foot end of said rigid arm at the proximal side of said chair, said safety-belt system comprising a fastening device glideably connected to said safety belt with belt-guiding means, whereby said safety-belt attachment means comprise a third attachment point, situated at the distal side of said seat element, whereby said fastening device fits a first fastening counterpart connected to said third attachment point of said safety-belt attachment means.

11. A device according to point 10, whereby said safety-belt attachment means comprise a fourth attachment point, connected to said vehicle floor, whereby a second fastening counterpart of said fastening device is connected to said fourth attachment point.

12. A foldable chair comprising a seat element and a back support suitable for use in a device according to any of the points 5 to 11.

13. A connector for attaching a foot support to a vehicle floor, suitable for use in a device according to any of the points 8 to 11.

14. A system comprising a device according to any of the points 1 to 11 and a floor comprising a rail in an essentially longitudinal direction, whereby the connector of said device is capable of connecting the foot support to said floor along said rail.

15. Use of a device according to any of the points 1 to 11, a foldable chair according to point 12, a connector according to point 13 and/or a system according to point 14 in a vehicle for transporting one or more able passengers, one or more disabled passengers, or a combination of both able and disabled passengers.

DETAILED DESCRIPTION OF THE INVENTION

Figure 1A:
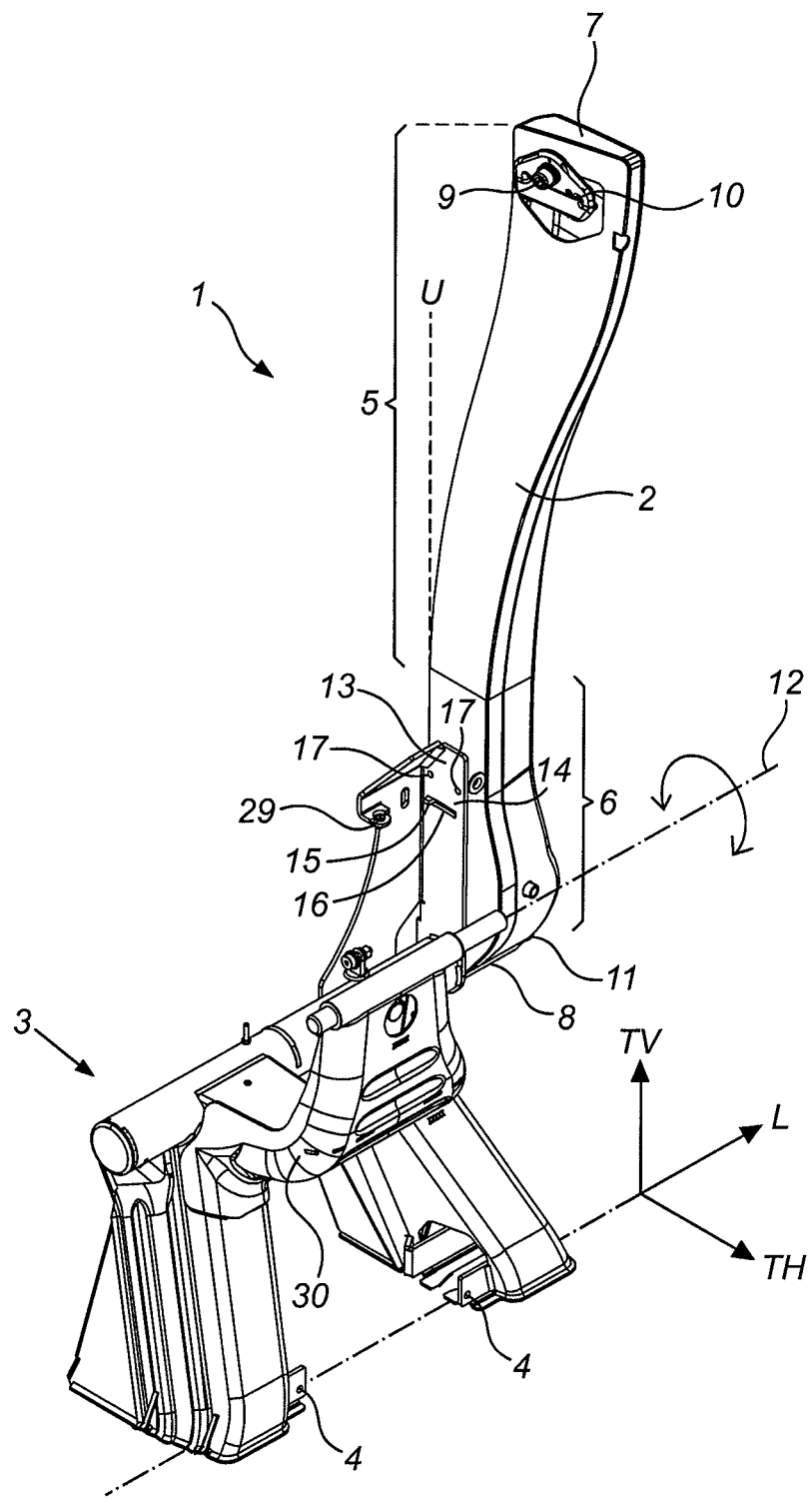
FIGS. 1a-2c show embodiments of the device from different perspectives and in different positions.

The present invention concerns a device comprising a rigid arm and a safety-belt system suitable for use in a transport vehicle of able people and/or people in a wheelchair, preferably combined with a foldable chair. The present invention further concerns the use of such device in a vehicle for transporting one or more able passengers, one or more disabled passengers, or a combination of both able and disabled passengers. These vehicles include, but are not limited to vehicles with load floors for conversion to mini busses, according to the strict rules applicable for passenger transport up to 8 people, ambulances, trains, busses, trams, airplanes, etc.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise," "comprising," and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The expression "% by weight" (weight percent), here and throughout the description unless otherwise defined, refers to the relative weight of the respective component based on the overall weight of the formulation.

From the nature of present invention, it should be clear that the terms "disabled person/people", "person/people in a wheelchair" and "wheelchair passenger(s)" refer to a person/people which at least during the period of the transport, make use of a wheelchair. These terms can be used interchangeably. In particular, the terms 'disabled' or 'disability' in the present context do not refer to other types of disabilities than the use of a wheelchair. The term "able person/people" refers to people who do not need a wheelchair or at least are not being transported in a wheelchair. The term 'able person/people' in present context is thus only meant to provide the distinction with a person/people in a wheelchair.

The term "longitudinal direction" refers in the present context to the front-to-back or back-to-front direction of a person using the device. More in particular, we assume that the device of the present invention is used in a vehicle and that the passenger using such a device faces the front of the vehicle during transport. Hereby, the longitudinal direction is also the longitudinal direction of the vehicle. However, it should be clear that the device may also be installed in a different direction in a vehicle, e.g. sideways whereby the passenger faces the side windows. In such cases, the "longitudinal direction" as used in this document does not coincide with the longitudinal direction of the vehicle.

The terms "upright", "horizontal", "longitudinal", "transverse", "sideward", "forward", "backward", "perpendicular", etc., i.e. terms denoting a direction are usually preceded by the term "essentially" and if not, may be implicitly understood to be preceded with "essentially". As such, the directions as they can be deduced or are presented theoretically should be considered as the directions which are preferred. However, deviations from this preferred direction may be allowed up to 45°, preferably up to 30°, more preferably up to 20°, even more preferably up to 10°, yet more preferably up to 5°, most preferably up to 1°. When a direction is thus indicated as "upright", "horizontal", "longitudinal", "transverse", "sideward", "forward", "backward", "perpendicular", etc., it may refer to a direction within a cone around said preferred directions with opening angle less than 45°, preferably less than 30°, more preferably less than 20°, even more preferably less than 10°, yet more preferably less than 5°, most preferably less than 1°.

The terms "straight", "rectangular", "cylindrical" or "circular", "along", etc., i.e. terms denoting a shape or curve are usually preceded by the term "essentially" and if not, may be implicitly understood to be preceded with "essentially". As such, the shapes or curves as they can be deduced or are presented theoretically should be considered as the shapes or curves which are preferred. However, deviations from these preferred shapes or curves may be allowed. A "straight" curve, may thus be slightly curved, whereby the deviation can be characterized by the ratio of the length of the curve to the radius of curvature. A "rectangular" shape may have slightly curved side edges, whereby the deviation can be characterized by the ratio of the length of the side edge to the radius of curvature, or the angles may deviate from 90°, whereby the deviation is characterized by the relative deviation ratio, etc. A "cylindrical" or "circular" shape may be slightly eccentric, e.g. oval, whereby the deviation from a cylindrical or circular shape can be characterized by the ratio of the difference between the radius of curvature and radius of the circular base or circle to the radius of the circular base or circle itself. A first trajectory "along" a second trajectory may slightly deviate from the shape of the second trajectory, whereby the deviation can be characterized by the ratio of the deviation which is transverse to the second trajectory to the length of the second trajectory. These ratios are preferably smaller than 100%, more preferably smaller than 30%, even more preferably smaller than 10%, yet more preferably smaller than 3%, still more preferably smaller than 1%, yet even more preferably smaller than 0.3%, most preferably smaller than 0.1%.

The terms "unfolded", "seating" and "folded" for denoting the position of the foldable chair refer to the states of the chair whereby both seat element and back support are unfolded, whereby the seat is unfolded but the back support is folded, and whereby both seat element and back support are folded respectively. These terms may also denote the state of the components of the chair, in which case they refer to the state of the component, e.g. when the seat element is said to be unfolded, it means that the chair can be in a seating position, an unfolded position or any position intermediate to seating and unfolded position.

In a first aspect, the invention provides a device suitable for use in a transport vehicle of able people and/or people in a wheelchair, comprising:
  a foot support comprising foot attachment means for attachment to a vehicle floor;
  a rigid arm having a shoulder end and a foot end, said rigid arm connected near said foot end to said foot support;
  a safety-belt system comprising a safety-belt and safety-belt attachment means, whereby said safety-belt attachment means comprise a first attachment point with belt-guiding means situated near the shoulder end of said rigid arm,
characterized in that said rigid arm is attached to said foot support by means of one or more arm hinges, whereby said rigid arm is capable of rotating around said arm hinges. Because the rigid arm can rotate, the position of the first attachment point of the safety-belt system can be adjusted in height and horizontal displacement for the safety and comfort of wheelchair passengers. The rigid arm is attached to a foot support which can be fixed to a vehicle's floor with foot attachment means. In an embodiment, the foot attachment means for attaching the chair to the vehicle floor may be such that they are easily releasable and attachable to remove or add a chair from or to the vehicle if necessary. This increases the employability of the vehicle, since one can decide on the number of devices as presented in this document which are to be installed in a vehicle, e.g. when the expected number of wheelchair passengers is small, but the expected amount of luggage is large, the number of devices in the vehicle can be reduced, and when the expected number of wheelchair passengers is large, the number of devices in the vehicle can be increased.

The foot end of the rigid arm is the end which is located nearer to the feet of a seated person and/or to the arm hinges with which the rigid arm is connected to the foot support, while the shoulder end is located nearer to the shoulder of a seated person. The rigid arm is connected near its foot end to the foot support of the foldable chair. With 'near' its foot end, it is meant that the rigid arm is connected to the foot support in a region which is situated below or at most 40 cm, preferably at most 30 cm, more preferably at most 20 cm above the seating surface of the foldable chair in the unfolded position. Furthermore, a first attachment point of the safety-belt attachment means is situated near the shoulder end of said rigid arm. With 'near' the shoulder end, it is meant that the first attachment point is located along the rigid arm above the seating surface of the foldable chair in the unfolded position or the seating surface of an average wheelchair, preferably at least 20 cm, preferably at least 30 cm, more preferably at least 40 cm, even more preferably at least 50 cm above said seating surface. The first attachment point is preferably located just above the position of the shoulder of a seated person. Therefore, the rigid arm should at least be large enough such that, in an essentially upright position, its shoulder end is preferably located above the shoulder height of a tall seated person, hereby allowing the first attachment point to lie just above the position of the shoulder of a tall seated person. In a preferred embodiment, the first attachment point can be slideably adjusted along the rigid arm, hereby allowing a passenger to adjust the height of the first attachment point to improve his safety and comfort.

In an embodiment, said arm hinges define an axis around which said rigid arm is capable of rotating between an essentially upright position and a tilted position when said rigid arm is unlocked. The possible rotation movement of the rigid arm is thus restricted to a rotation around one axis which is fixed with respect to the foot support. This embodiment is cheaper and more secure, since the arm hinges can be made stronger. Furthermore, it is easier to use.

In an embodiment, said arm hinges define an axis comprising a horizontal component for adjusting height and horizontal displacement of the first attachment point for the safety and comfort of wheelchair passengers.

In a preferred embodiment, the device comprises arm blocking means defining a maximum tilting angle α between said essentially upright position and said tilted position, whereby said maximum tilting angle is smaller than 45°, preferably smaller than 20°, more preferably smaller than 15°, and larger than 1°, preferably larger than 5°, more preferably larger than 8°, most preferably about 10°. The maximum tilting angle can be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45 degrees or any value in between.

In an embodiment, the device comprises arm locking means for fixing said rigid arm in an essentially upright position and/or a tilted position. Thereby the arm cannot tilt unwantedly. In a preferred embodiment, said arm locking means comprise a protrusion mounted on the rigid arm which is inserted in a slit in the foot support and which can be fixed at pre-determined fixing positions along this slit. In a more preferred embodiment, these fixing positions comprise both ends of this slit. In a preferred embodiment, said arm locking means comprise one or more ball plungers, spring plungers and/or ball spring plungers attached to the rigid arm and a number of recesses at pre-determined positions in the foot support for holding said plungers. One or more ball plungers, spring plungers and/or ball spring plungers may also be attached to the foot support and a number of recesses and/or holes may be present at pre-determined positions in the rigid arm for holding said plungers.

In an embodiment, the rigid arm comprises a shape which is wider in the longitudinal direction with respect to the vehicle in which it can be installed near said foot end and/or near said arm hinges than near said shoulder end. When the safety-belt system is needed, e.g. because of strong breaking or even an accident, the largest moment of force will act near the foot end of the rigid arm, whereby the moment of force is expected to lie essentially transverse and horizontal, i.e. the moment of force will try to make the rigid arm bend over. Therefore it is necessary to make the foot end strong enough. To keep the rigid arm both strong enough for safety reasons and light enough for easy installing or removing, the rigid arm preferably has a shape which is smaller near the shoulder end and wider at the foot end, and this in the longitudinal direction.

In an embodiment, said device comprises a foldable chair comprising a seat element attached to said foot support with chair attachment means, and a back support attached to said seat element with back attachment means, said chair capable of being folded between an unfolded position suitable for transport of an able person and a folded position suitable for transport of a person in a wheelchair, whereby said chair in said unfolded position comprises a proximal side near said rigid arm in said essentially upright position and an opposite distal side. In the unfolded position, the chair offers a seating place to an able person, while in the unfolded position, the chair makes way for a wheelchair, without the necessity of removing it all together or partly from the vehicle. Therefore one or more of such chairs may be installed in vehicles which transport one or more able passengers, one or more disabled passengers, or a combination of both able and disabled passengers at the same time or at different times during consecutive trips.

In a preferred embodiment, the chair attachment means comprise one or more seat hinges defining a first axis around which the seat element is capable of rotating with respect to said foot support between a seating position and a folded position. In a more preferred embodiment, said first axis is essentially horizontal, said first axis lies in an essentially longitudinal direction and/or said first axis lies nearer to the proximal side of the chair than to the distal side of the chair.

In a preferred embodiment, the chair attachment means comprise a mechanical actuator for holding the seat element in either a folded position or in a seating position. In a more preferred embodiment, said mechanical actuator comprises a gas spring.

In a preferred embodiment, the device comprises a first seat blocking element attached to the foot support and a second seat blocking element attached to the seat element of a foldable chair, whereby these two seat blocking elements engage with each other when the seat is in a seating position, thereby restraining the seat element from rotating further than the seating position in the direction of unfolding the seat element.

In a preferred embodiment, the seat element comprises an arm locking element for fixing the rigid arm in an essentially upright position, preferably by engaging with a protrusion of arm locking means mounted on the rigid arm and inserted in a slit in the foot support. In a more preferred embodiment, said arm locking element and said second seat blocking element are the same element or are located near to each other.

In a preferred embodiment, the foot support comprises a bent part at the top of which the seat element can be mounted, preferably with one or more hinges, and which restrains the seat element, preferably with an upstanding part, from rotating further than the folded position in the direction of folding the seat element.

In a preferred embodiment, said back support is connected to said seat element by means of one or more back hinges defining a second axis around which said back support is capable of rotating when it is unlocked between a seating position and an unfolded position. In a more preferred embodiment, said first axis and said second axis are mutually perpendicular and not in the same plane situated. This allows for a more compact chair when it is folded.

In a preferred embodiment, the chair comprises a seating lock mechanism for locking the back support in a seating and/or folded position, or more generally, in a position where the back support is folded onto the seat element. In a more preferred embodiment, the seating lock mechanism is located near back hinges between the seat element and the back support. In an even more preferred embodiment, the seating lock mechanism is a ballpoint-pen-like locking mechanism whereby one push locks the back support on top of the seat element and another push unlocks the back support for rotating it to an unfolded position.

In a preferred embodiment, the foldable chair comprises a head support comprising one or more bars, which is connected to said back support by means of said bars which can slide along sliding means attached to said back support, and whereby said head support can slide between an extended position and a bottom position. Preferably, said bottom position is such that the head support is at least partly slidden into or over the back support.

In a preferred embodiment, the device comprises a back support locking mechanism for fixing the back support in an unfolded position. In a more preferred embodiment, the back support locking mechanism comprises a protrusion attached to the rigid arm, preferably near the shoulder end, and a gripping element attached to the back support which can engage with said protrusion to fix the back support in an unfolded position. In an even more preferred embodiment, the protrusion attached to the rigid arm comprises a striker, and the gripping element comprises a latch and a pawl.

In a more preferred embodiment, the foldable chair comprises a transfer mechanism capable of transferring a force from the head support to the back support locking mechanism for unlocking the back support from said unfolded position. In a particularly preferred embodiment, the transfer mechanism comprises a rod-and-lever system, whereby one or more bars of said head support is capable of being pushed against one end of the lever, thereby transferring a force to the rod connected to another end of said lever, said rod hereby unlocking said back support locking mechanism; preferably said rod is attached to a pawl of said back support locking mechanism. In an embodiment, one or more bars of said head support only engage said lever when the head support is near, at and/or beyond said bottom position. Preferably, said back support comprises a mechanical means, preferably one or more springs, connected to at least one of said bars of said head support for pushing said head support back to said bottom position when said head support is in a position beyond said bottom position.

In a preferred embodiment, the foldable chair comprises a back support and the rigid arm is situated essentially along the proximal side of the back support when the chair is in the unfolded position.

In an embodiment, the seat element and/or back support of the foldable chair comprise an inflatable component, such as an inflatable cushion. This allows for an even more compact folded chair.

In an embodiment, the foldable chair comprises lighting elements such as lamps or LEDs. This has a number of advantages such as a better visibility of the chair and/or chair edges, or the lighting can be used by the passenger for reading, etc.

In an embodiment, the foldable chair comprises a handle attached to the distal side of the chair. This handle can be very convenient for helping or supporting someone who is moving along the aisle in the transport vehicle.

The rigid arm may be straight or curved. In a preferred embodiment, the rigid arm has a profile which is adjusted to fit the profile of the proximal side of the back support of the foldable chair. In a more preferred embodiment, the profiles of the rigid arm and the proximal side of the back support are curved in a way that when the back support is being unfolded, the back support pushes the rigid arm towards a more upright position.

In an embodiment, the rigid arm is clamped by said foldable chair in an essentially upright position when said foldable chair is in said unfolded position.

In an embodiment, the device of the present invention comprises a connector for attaching the foot support to a vehicle floor, preferably this connector is releasable such that a foot support can be removed from the vehicle. In a preferred embodiment, the connector comprises a sledge, a T-bolt-like profiled clamping member and a clamping actuator, whereby the clamping actuator is placed on the sledge and is capable of lifting the T-bolt-like profiled clamping member such that the connector is clamped with the T-bolt-like profiled clamping member to the vehicle floor, preferably to a rail comprising a U-shaped cross section and/or overhanging edges in said vehicle floor.

In a more preferred embodiment, the sledge comprises a frame and two profiled plates, each of which is capable of rotating around a preferably essentially longitudinal pivot axis which is fixed with respect to the frame. In a more preferred embodiment, the T-bolt-like profiled clamping member comprises a slab-like upper part and a, preferably flatiron-like, lower part, preferably comprising essentially straight side edges and/or a peak-shaped front and/or back end. In an even more preferred embodiment, the lower part of said T-bolt-like profiled clamping member comprises upstanding side faces which are at least partly slanted with respect to the sides of the slab-like upper part of said T-bolt-like profiled clamping member. In a more preferred embodiment, the clamping actuator comprises a spindle, a spindle frame and a lifting frame, whereby the slab-like upper part of the T-bolt-like profiled clamping member is introduced through an essentially rectangular hole in the bottom of the spindle frame, whereby preferably the T-bolt-like profiled clamping member is restrained from moving in the longitudinal direction by the front/back side of the hole in the bottom of the spindle frame;

whereby the T-bolt-like profiled clamping member is attached to the lifting frame, preferably by an essentially cylindrical pivot bar whereby the pivot bar is inserted in a transverse hole through an upper end of the slab-like upper part of the T-bolt-like profiled clamping member and rests in slanted slits along the sides of the lifting frame, whereby the lifting frame is capable of moving along the longitudinal direction with respect to the spindle frame and the spindle is introduced through the spindle frame and the lifting frame in a longitudinal direction such that turning the spindle results in a longitudinal movement of the lifting frame with respect to the spindle frame, thereby moving said pivot bar upwards or downwards since it follows the slanted slits in the lifting frame's sides.

In a preferred embodiment, the spindle frame fits into the frame of the sledge and may slide forwards/backwards, but essentially not sideward, whereby the peak-shaped front or back end of the lower part of the T-bolt-like profiled clamping member fits between the two profiled plates of the sledge and helps to push the two profiled plates of the sledge outwards when the T-bolt-like profiled clamping member is guided in between the profiled plates.

In a preferred embodiment, the spindle frame can be attached to the bottom of the foot support of the chair or rigid arm. In a more preferred embodiment, the outer shape of the spindle frame is such that it fits a hole in the bottom of the foot support whereby the spindle frame can be fixed in said hole and/or the spindle frame can be attached with a bolting system to the foot support and/or the spindle frame can be welded to said foot support and/or the spindle frame can be attached to the foot support in any way known in the art.

In an embodiment, said safety-belt attachment means of the device comprise a second attachment point near said foot end of said rigid arm at the proximal side of said chair, said safety-belt system preferably comprising a fastening device, preferably comprising a tongue, glideably connected to said safety belt with belt-guiding means, whereby said safety-belt attachment means comprise a third attachment point, situated at the distal side of said seat element, whereby said fastening device, preferably comprising a tongue, fits a first fastening counterpart, preferably comprising a buckle, connected to said third attachment point of said safety-belt attachment means. As such, an able passenger can be secured with a safety-belt with at least three attachment points, more in particular, an able passenger can be secured with a three-point safety-belt system.

In an embodiment, said safety-belt attachment means of said device comprise a fourth attachment point, connected to a vehicle floor, whereby a second fastening counterpart, preferably comprising a buckle, of a fastening device, preferably comprising a tongue, which is glideably connected to said safety belt with belt-guiding means, is connected to said fourth attachment point. As such a wheelchair passenger can be secured with the safety belt of said safety-belt system.

In a preferred embodiment, said safety-belt attachment means of the device comprise a second attachment point near said foot end of said rigid arm at the proximal side of said chair, said safety-belt system preferably comprising a fastening device, preferably comprising a tongue, glideably connected to said safety belt with belt-guiding means, whereby said safety-belt attachment means comprise a third attachment point, situated at the distal side of said seat element, whereby said fastening device, preferably comprising a tongue, fits a first fastening counterpart, preferably comprising a buckle, connected to said third attachment point of said safety-belt attachment means, and said safety-belt attachment means of said device comprise a fourth attachment point, connected to a vehicle floor, whereby a second fastening counterpart, preferably comprising a buckle, of a fastening device, preferably comprising a tongue, which is glideably connected to said safety belt with belt-guiding means, is connected to said fourth attachment point. As such, an able passenger sitting in a device comprising a foldable chair in unfolded position can be secured with the same seat belt and safety-belt system as a wheelchair passenger positioned at the place of the same chair, but in a folded position. This reduces cost of the total system, it reduces the number of safety-belts necessary and/or it improves the equality and/or the feeling of equality between able and disabled passengers, while still ensuring the safety of the passengers.

In a further aspect, the present invention provides a system comprising a device as described above and a floor comprising a rail in an essentially longitudinal direction, whereby the connector of said device is capable of connecting the foot support to said floor along said rail. In a preferred embodiment, said rail has a U-shaped lateral cross section and/or overhanging edges, which are preferably essentially straight in the longitudinal direction. Preferably, the rail has an open slit at the top which is wider than the width of the lower part of the T-bolt-like profiled clamping member of the connector, and is also wider than the width between the two profiled plates of the sledge when they hang down freely, but the width of the open slit at the top is smaller than the width of the two profiled plates of the sledge when they are pushed apart sideways by the T-bolt-like profiled clamping member which can be introduced between the two profiled plates of the sledge.

The present invention also provides a method and/or mechanism for releasably connecting a device as described before with said foot support to a vehicle floor, by providing a connector, attached to the foot support, comprising a spindle actuator; by positioning said spindle actuator along the frame of the sledge such that the lower part of the T-bolt-like profiled clamping member and the two profiled plates of the sledge are separated, i.e. the lower part of the T-bolt-like profiled clamping member does not push the two profiled plates of the sledge to the sides; by introducing the lower part of the T-bolt-like profiled clamping member and the two profiled plates of the sledge in the rail, preferably through an open slit at the top of the rail, while the bottom of the spindle frame or of the foot support attached to the spindle frame rests on the overhanging edges of the rail; by sliding the spindle frame and sledge with respect to each other such that the lower part of the T-bolt-like profiled clamping member is introduced in between the two profiled plates of the sledge, thereby pushing these profiled plates outwards such that the total width of the lower part of the T-bolt-like profiled clamping member and the two profiled plates of the sledge is larger than the width of the top opening of the rail. Hereby, due to the at least partly slanted side faces of the lower part of the T-bolt-like profiled clamping member and the profile of the profiled plates, the connector cannot be lifted from the rail completely. However, it can still slide along the rail. The connector and/or foot support can be further fixed to the floor by lifting the T-bolt-like profiled clamping member upwards by turning the spindle of the clamping actuator, whereby the lower part of the T-bolt-like profiled clamping member pushes both sideways and upwards on the profiled plates of the sledge, which thereby clamp the overhanging edges against the bottom of the foot support or spindle frame.

EXAMPLES

Figure 1B:
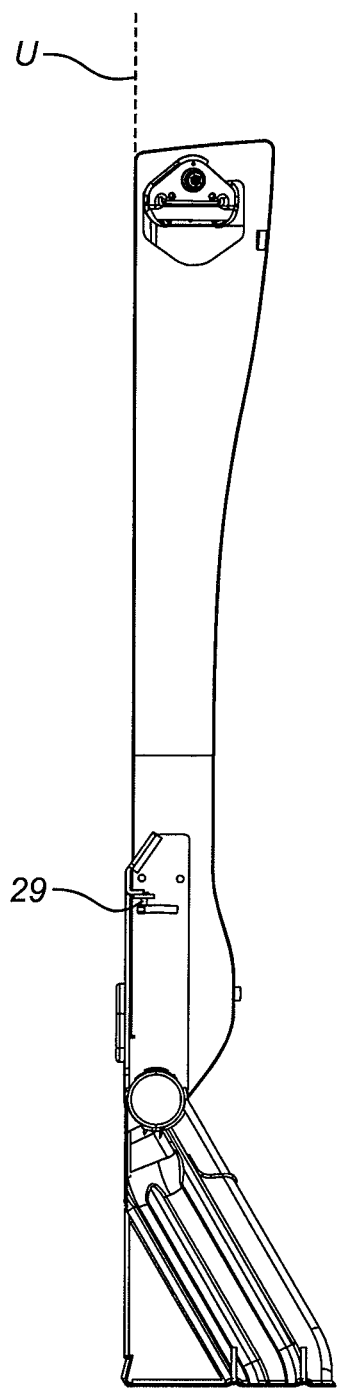
Figure 2A:
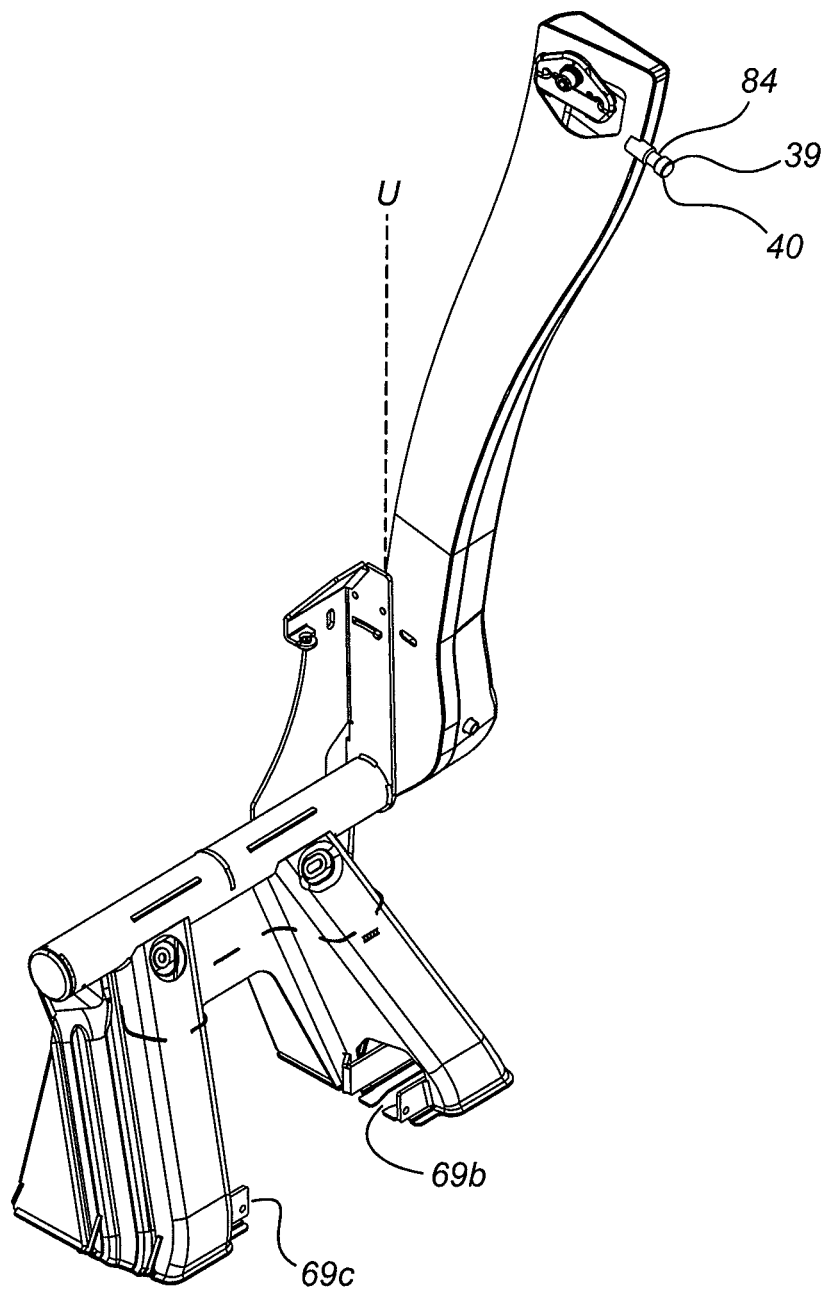
Figure 2B:
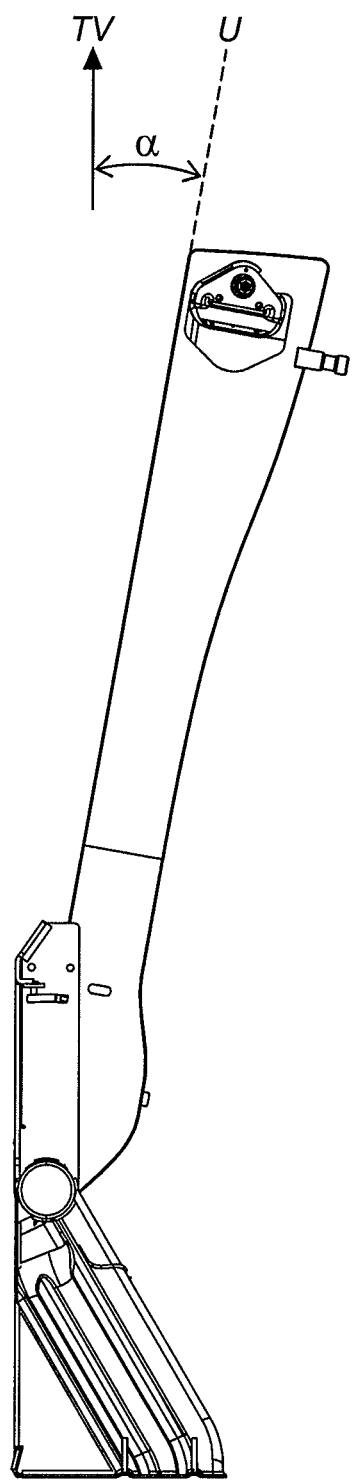

FIGS. 1a, 1b, 2a, 2b, 2c show embodiments of the device from different perspectives and in different positions. FIGS. 1a and 1b show a device (1) comprising a foot support (3) and a rigid arm (2), which can be connected to a vehicle floor with foot attachment means (4). The rigid arm comprises a shoulder end (7) and a region near the shoulder end (5), and a foot end (8) and a region near the foot end (6). A first attachment point (9) for the safety-belt attachment means is located near the shoulder end (7) in the shoulder end region (5). Belt-guiding means (10) are attached to this first attachment point (9). A second attachment point (18) for the safety-belt attachment means is also shown; a retractor device (70) is attached to it. The rigid arm (2) is connected to the foot support (3) with an arm hinge (11) which defines an axis (12) around which the arm (2) can rotate. This axis (12) lies along an essentially longitudinal direction (L). The device comprises arm locking means (13) and arm blocking means (14). The arm locking means (13) comprise a protrusion (15) mounted on the rigid arm (2) inserted in a slit (16) in the foot support (3). The protrusion (15) and the ends of the slit (16) restrain the movement of the rigid arm (2) between an essentially upright position as shown in FIGS. 1a,1b, in which axis (U) fixed to the rigid arm and basically in the direction of the longest dimension of the rigid arm or in the direction defined by the position of the arm hinge (11) and first attachment point (9) and essentially perpendicular to axis (12), i.e. axis U lies essentially in the vertical direction (TV); and a maximally tilted position in which axis (U) makes an angle □ as shown in FIGS. 2a, 2b, which in this case is about 10°, with the direction of (U) in the essentially upright position of FIGS. 1a,1b.

Figure 3:
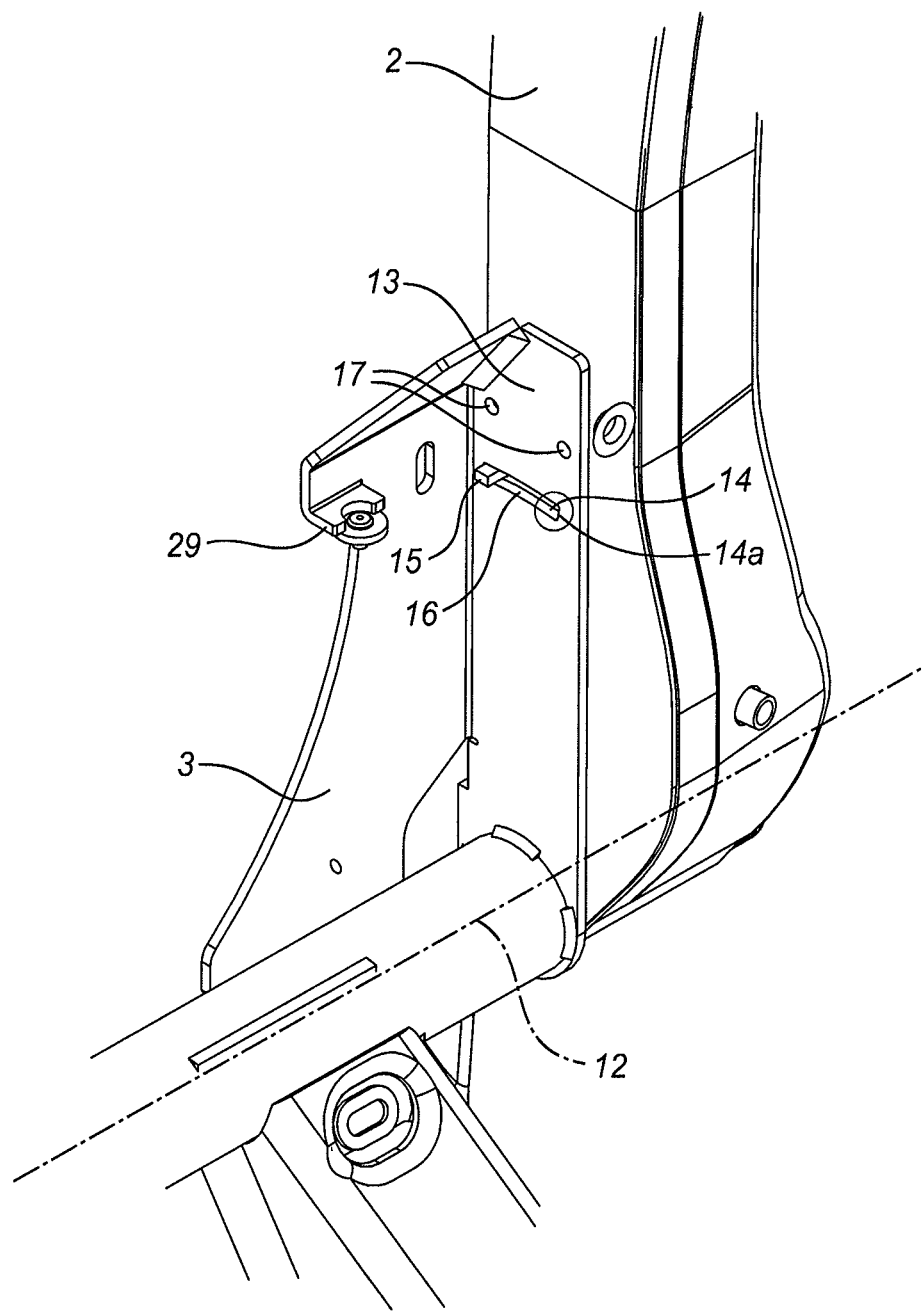
FIG. 3 shows arm blocking and locking means in an embodiment of the device.
Figure 4A:
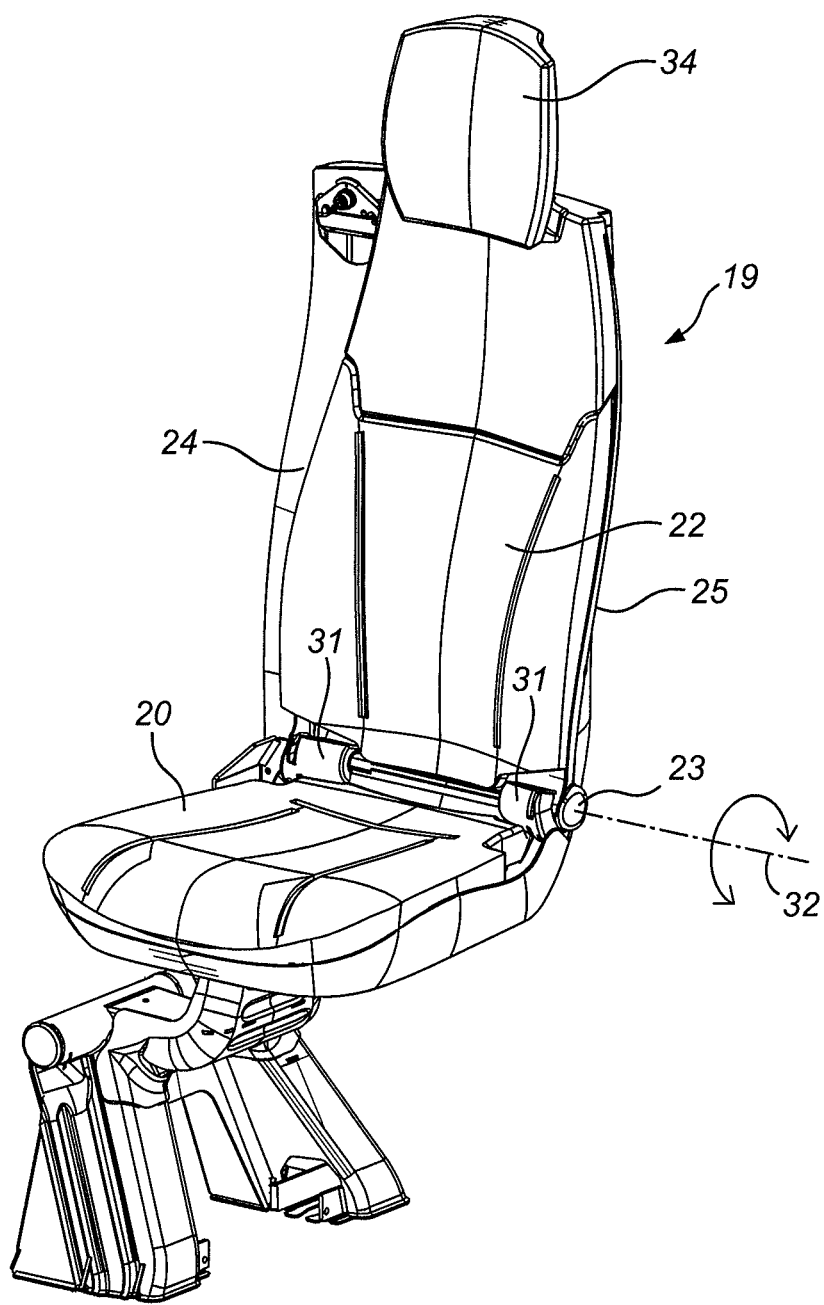
FIGS. 4a-6d show an embodiment of the device comprising a foldable chair in an unfolded position (FIGS. 4a-4d), in a seating position (FIGS. 5a-5d) and in a folded position (FIGS. 6a-6d), and this from different perspectives.
Figure 4B:
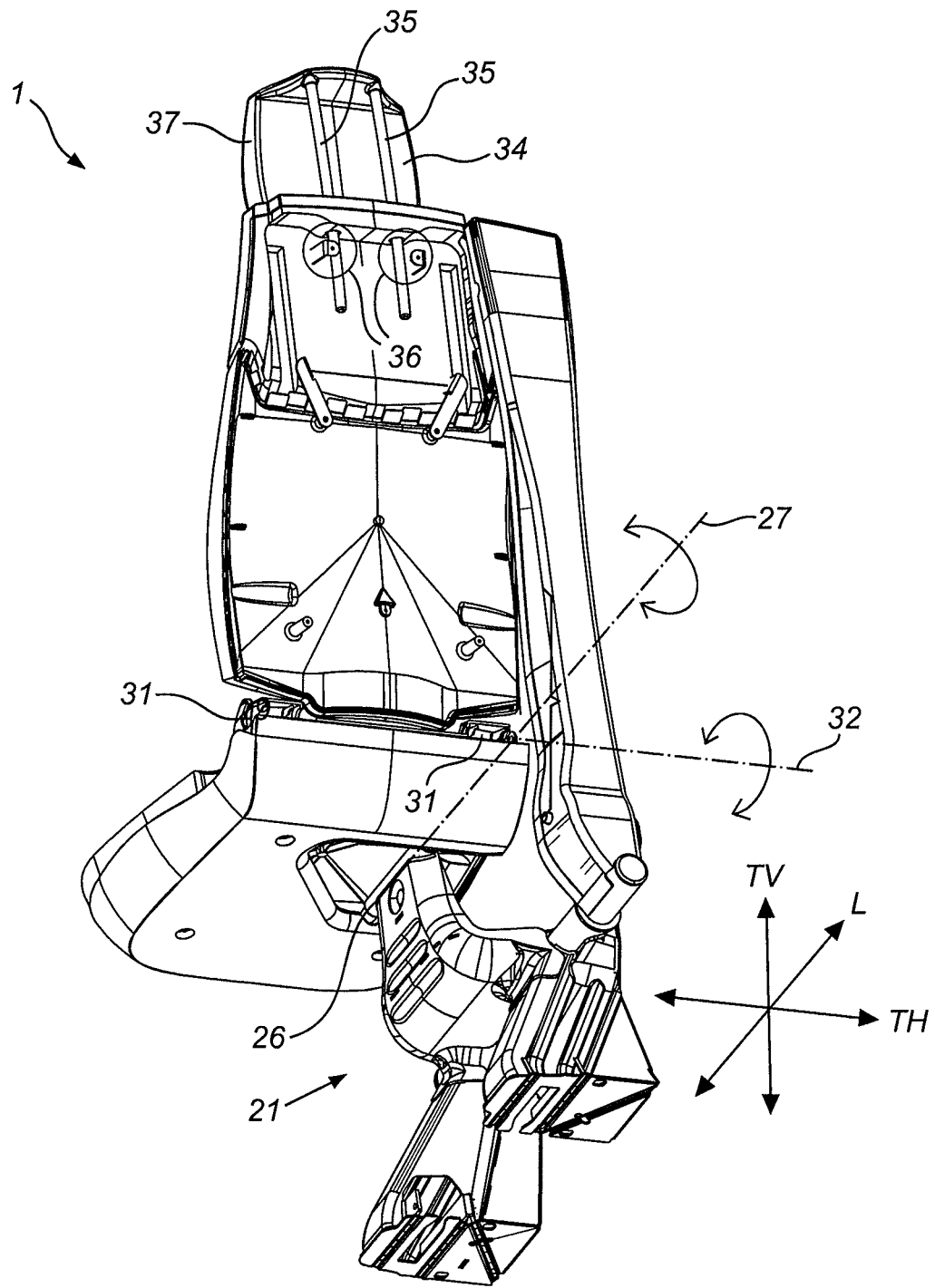
Figure 4C:
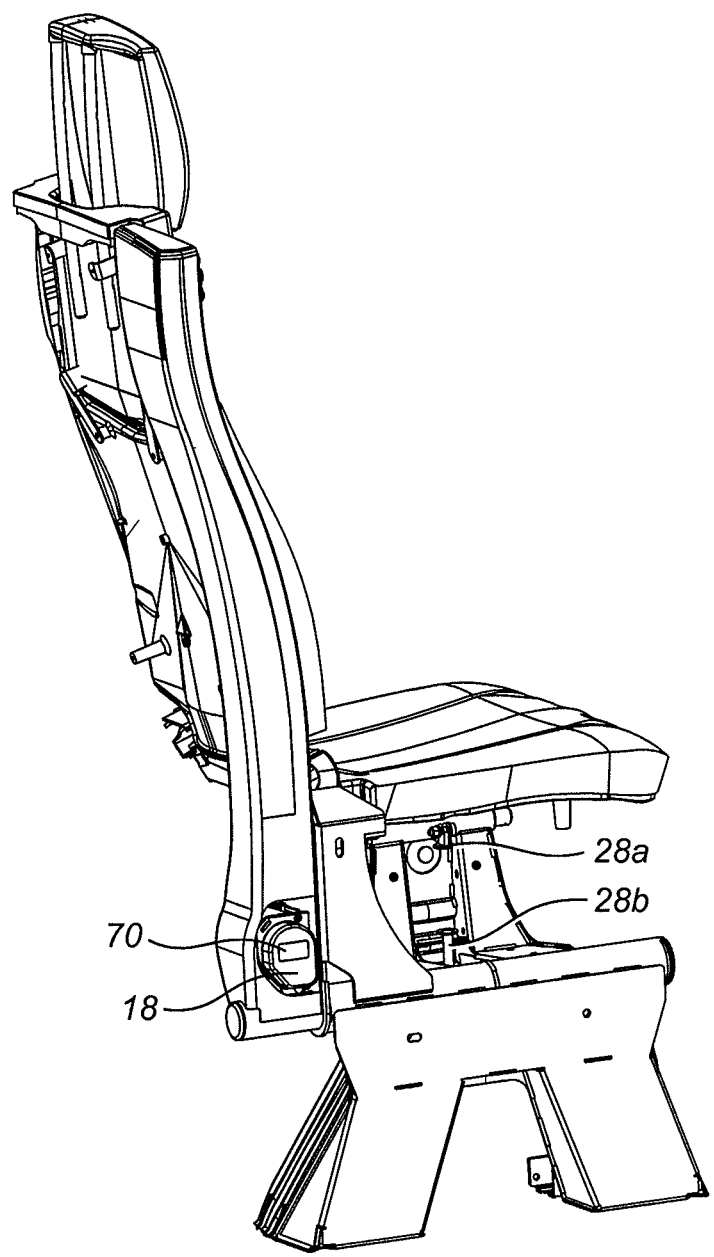
Figure 4D:
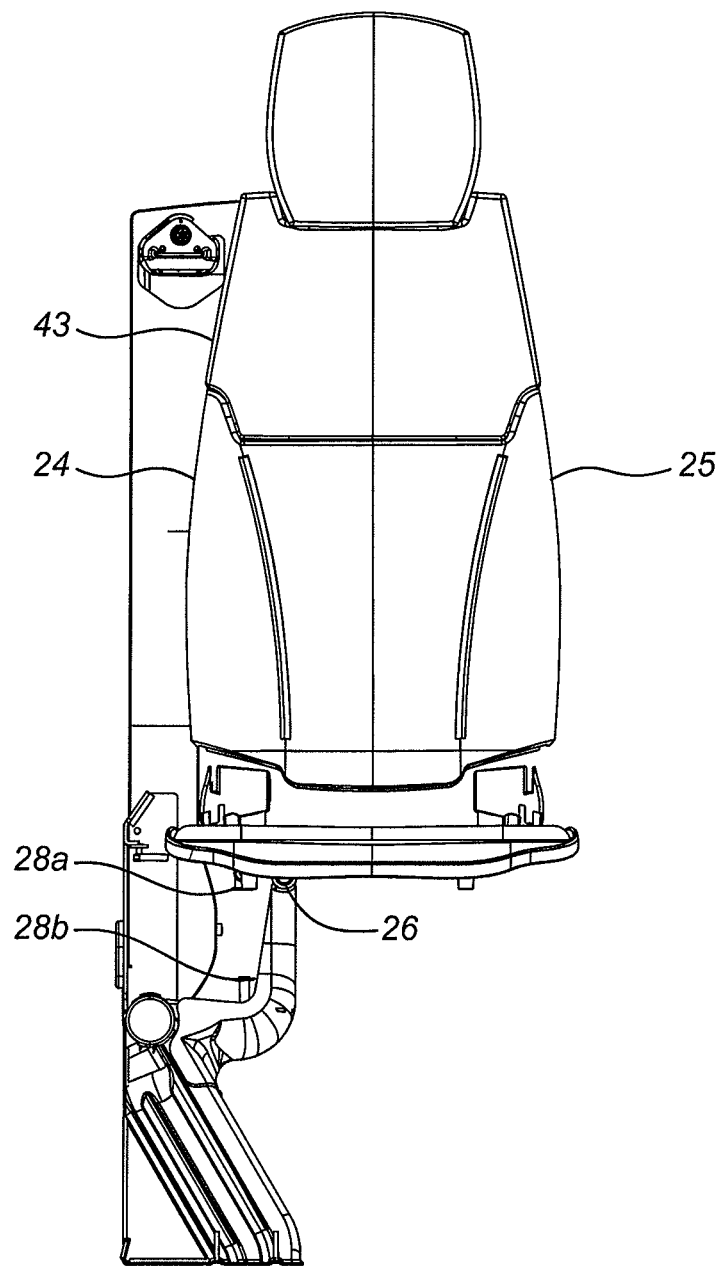
Figure 5A:
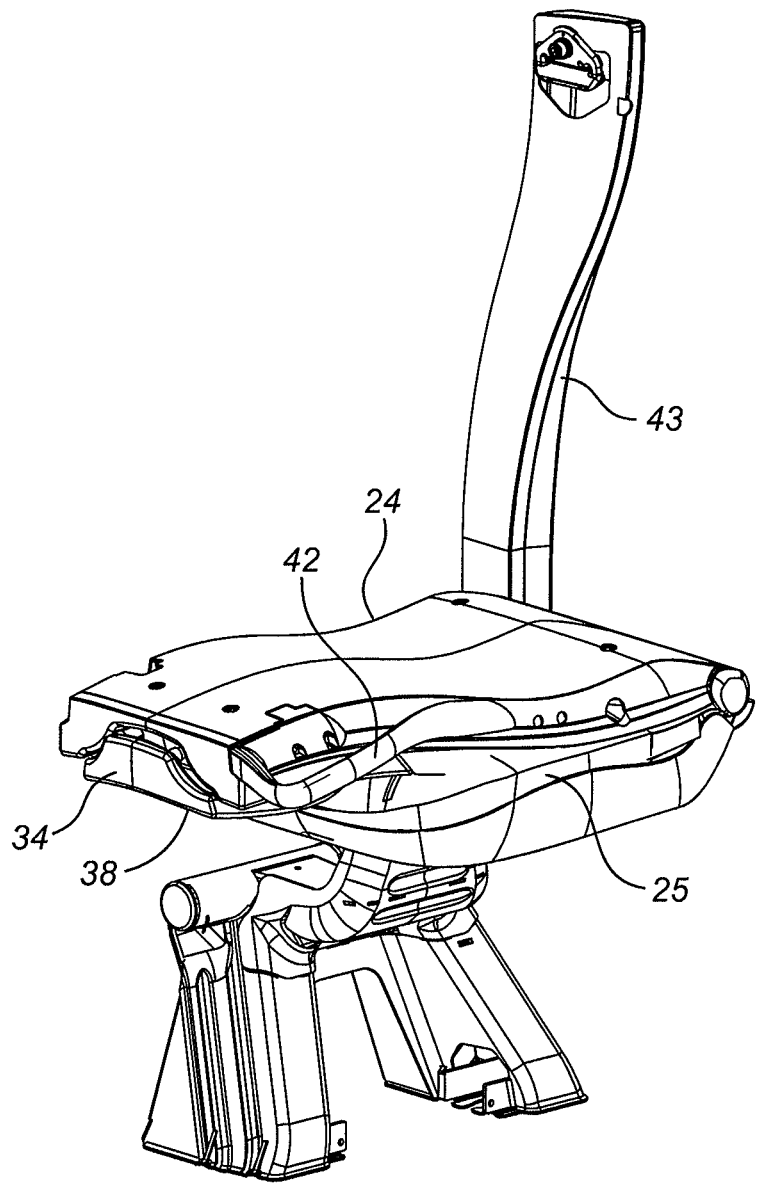
Figure 5B:
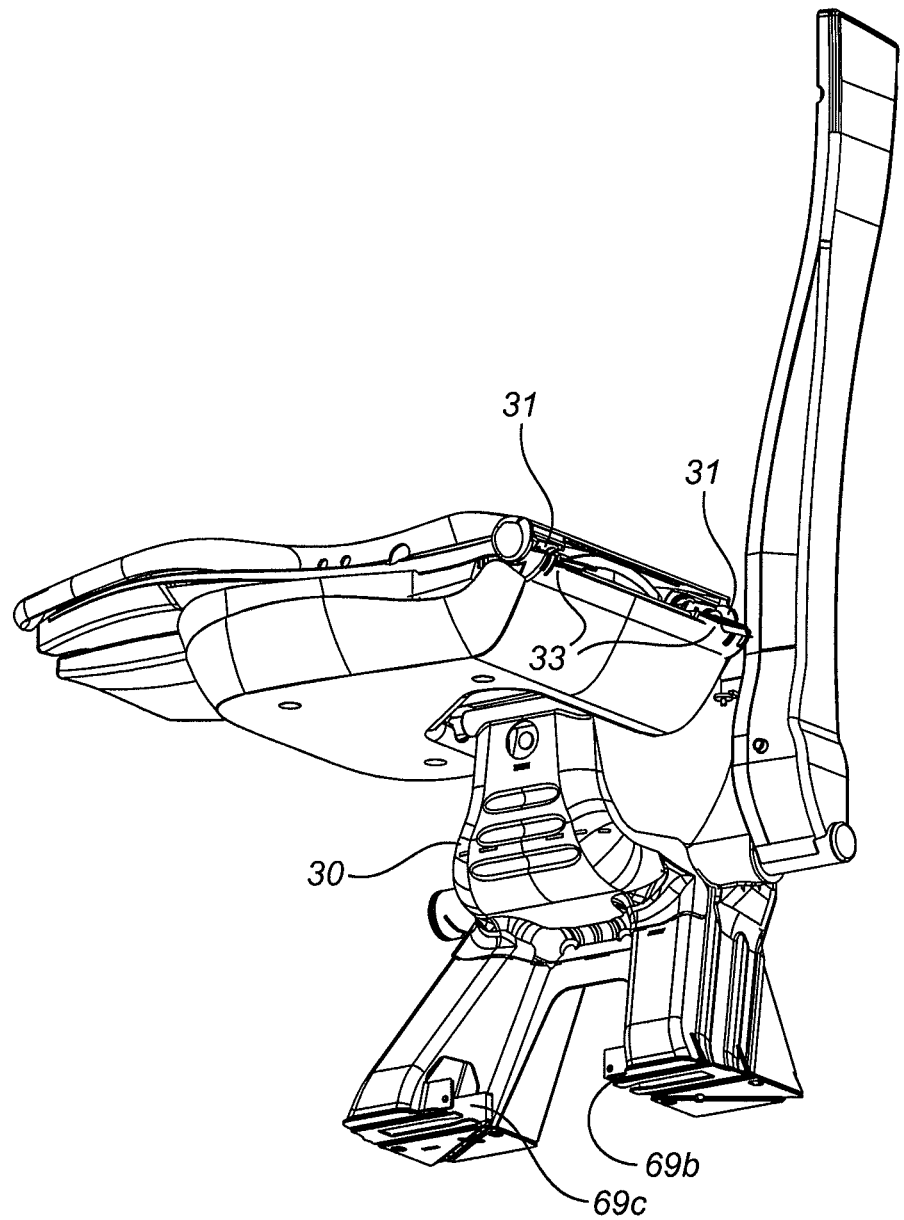
Figure 5C:
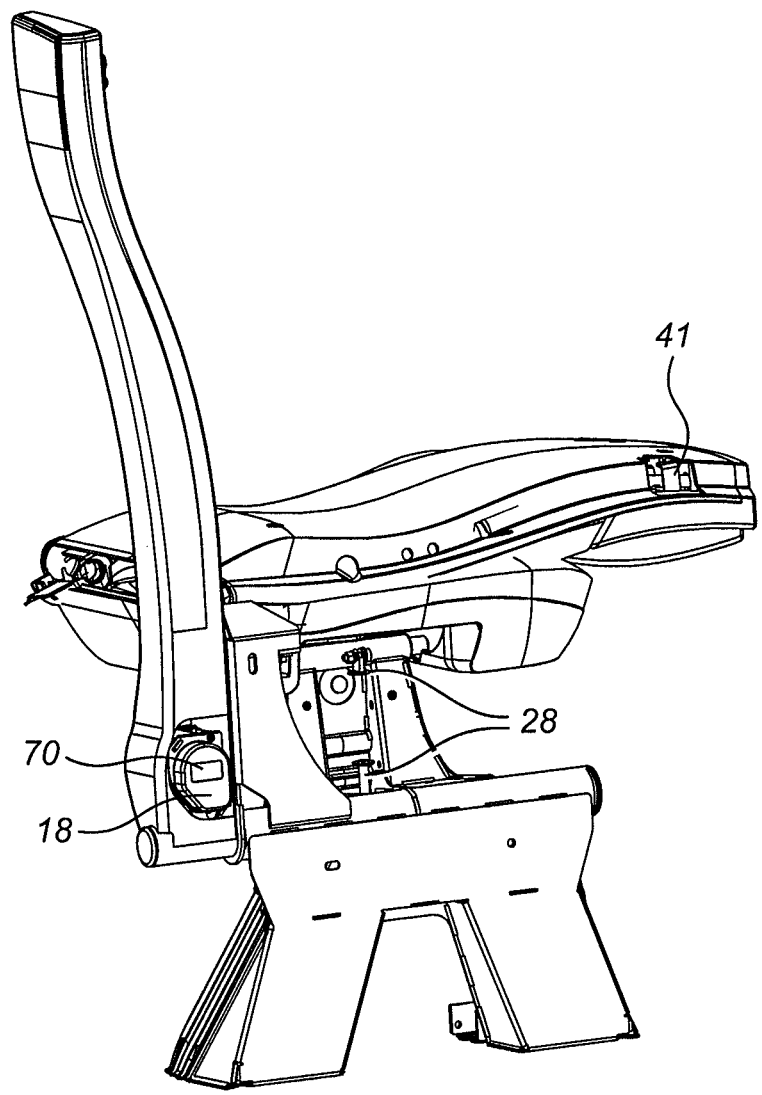
Figure 5D:
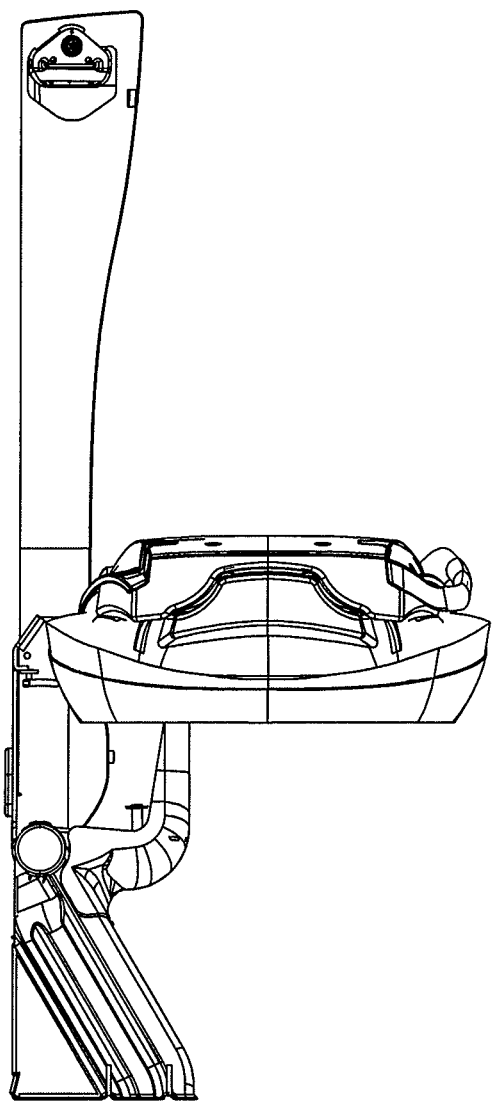
Figure 6A:
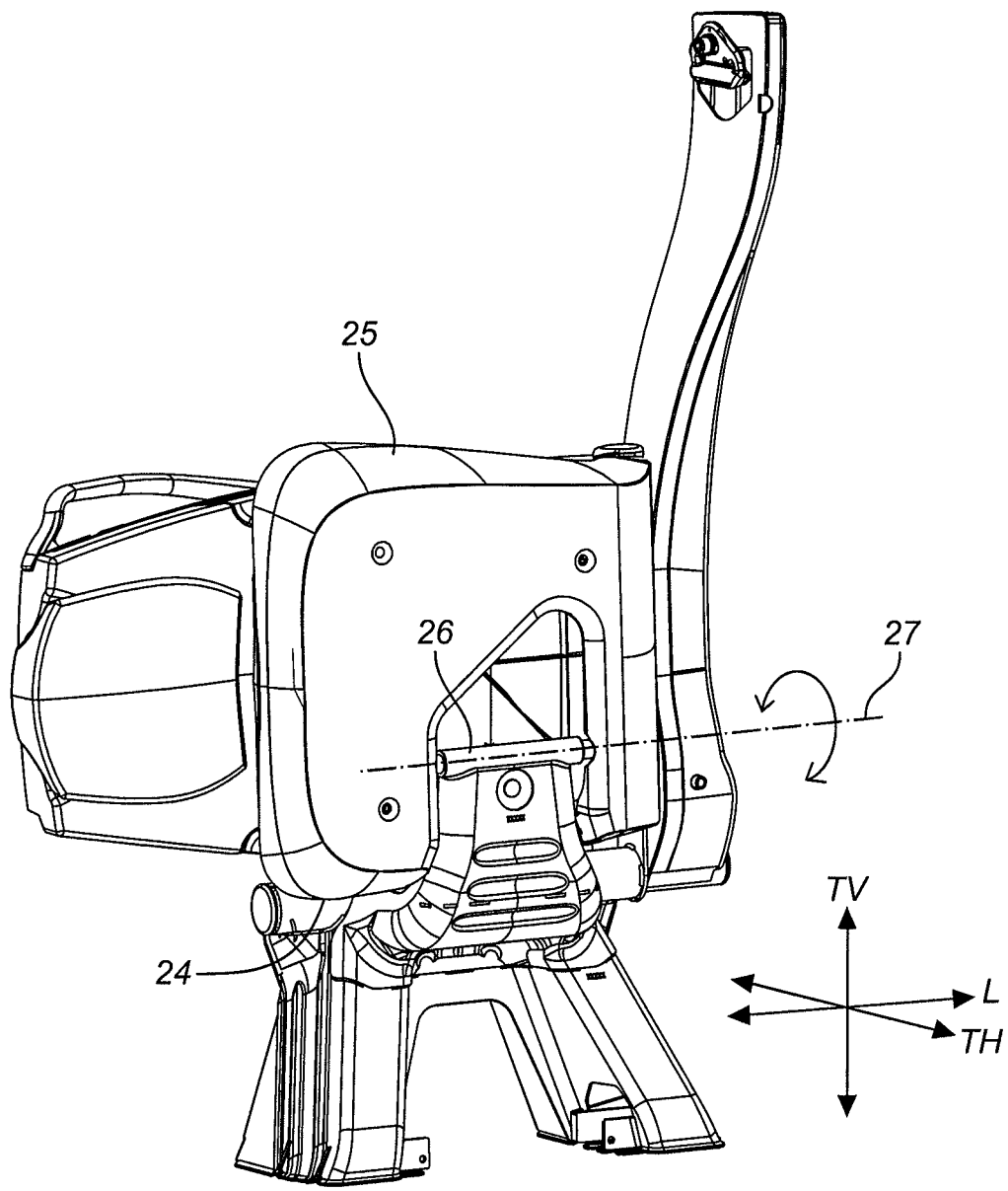
Figure 6B:
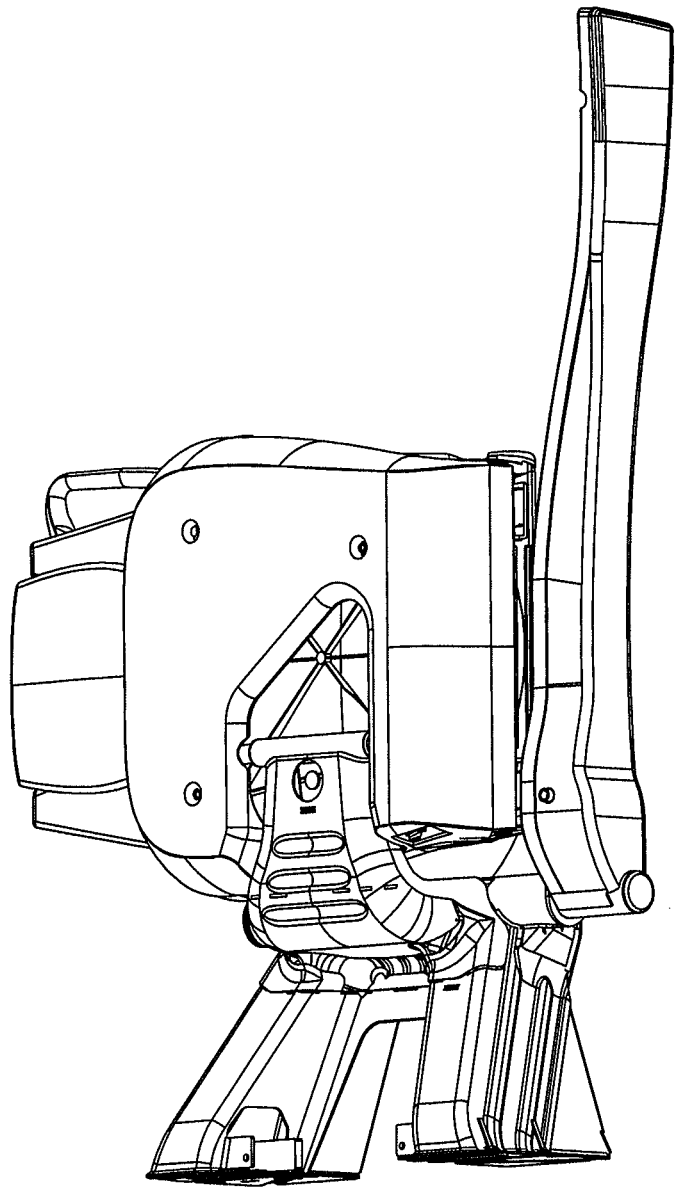
Figure 6C:
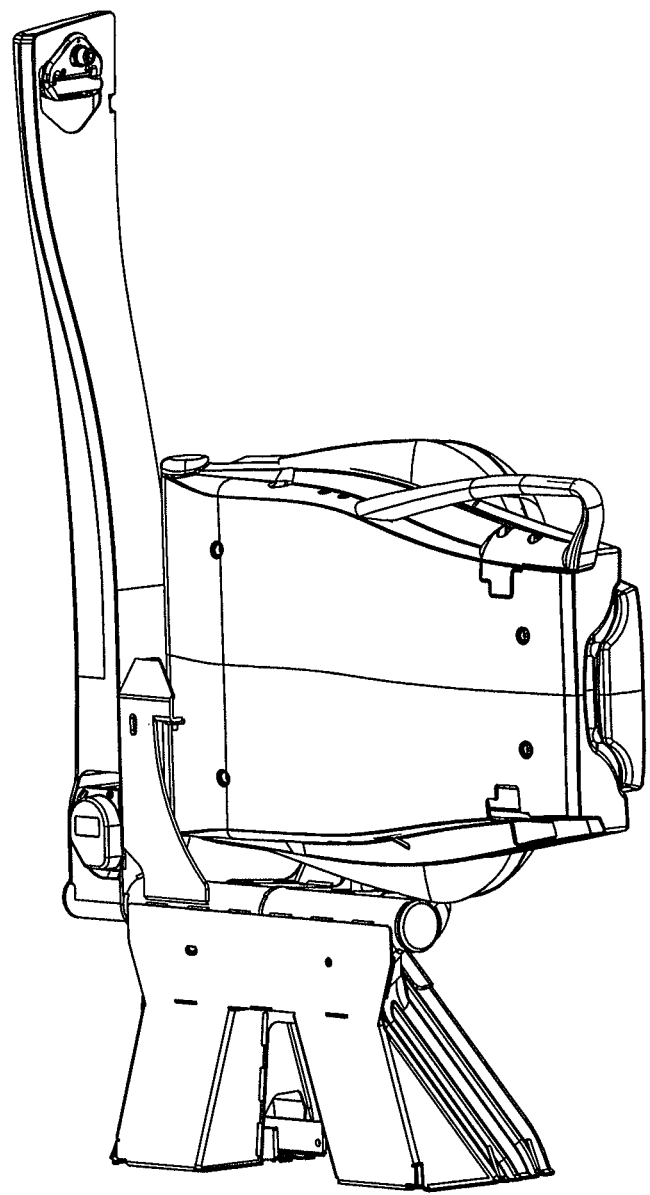
Figure 6D:
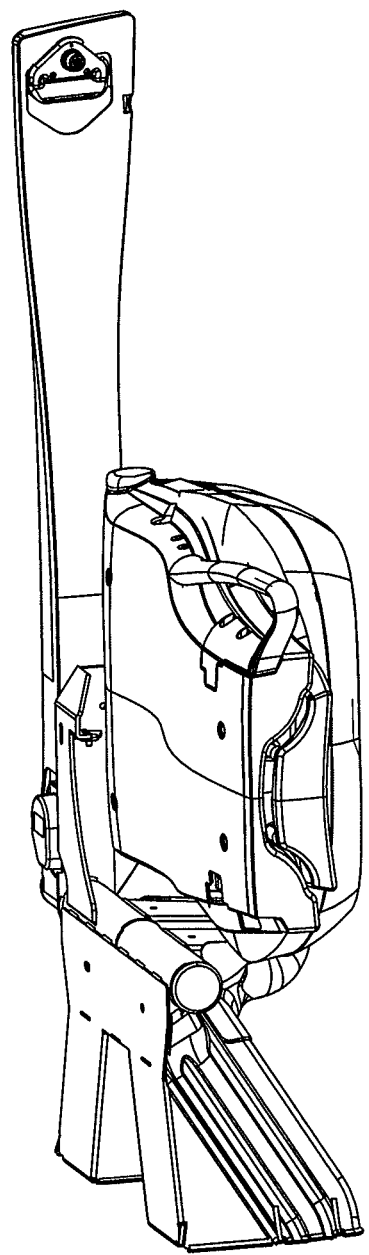
Figure 7:
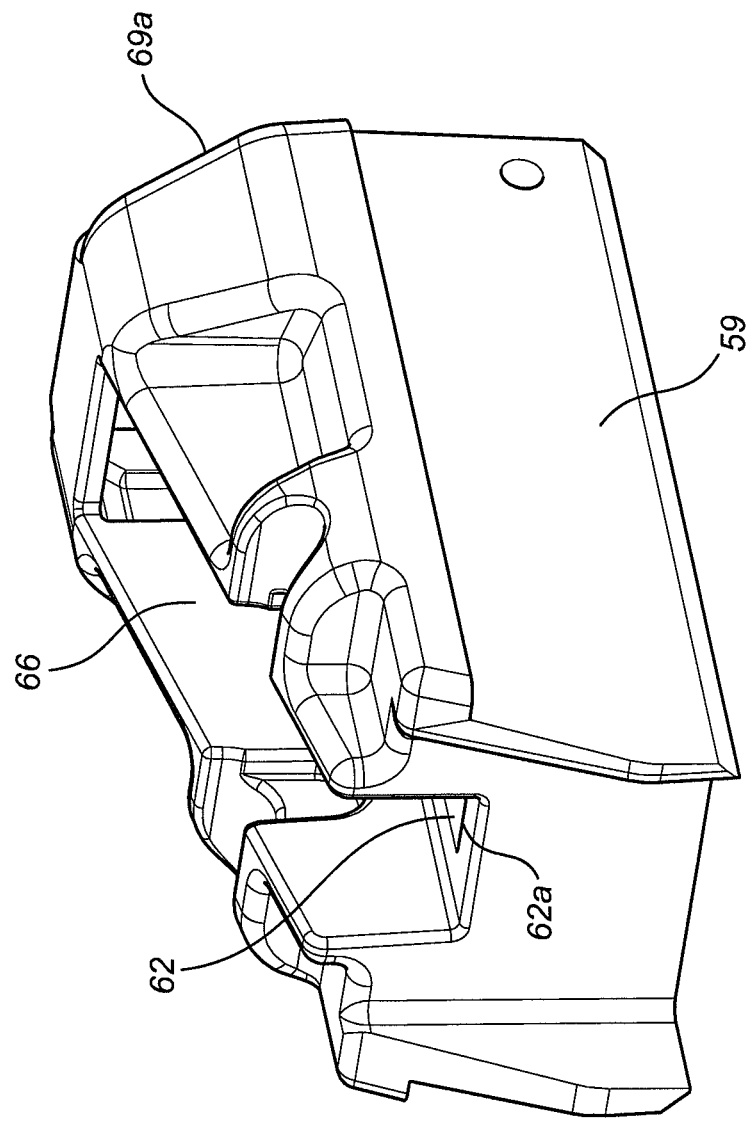
FIGS. 7-11b show an embodiment of a connector and its parts according to the present document.
Figure 8:
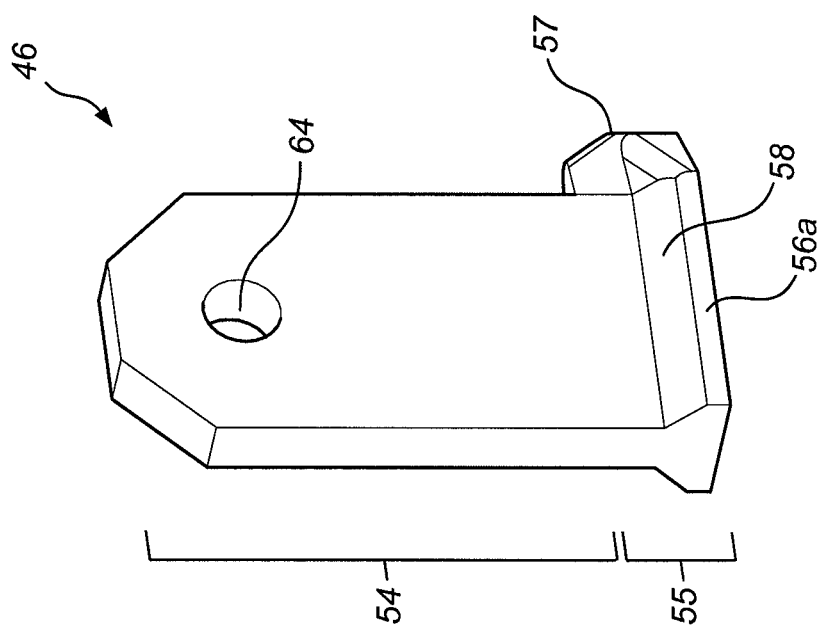
Figure 9A:
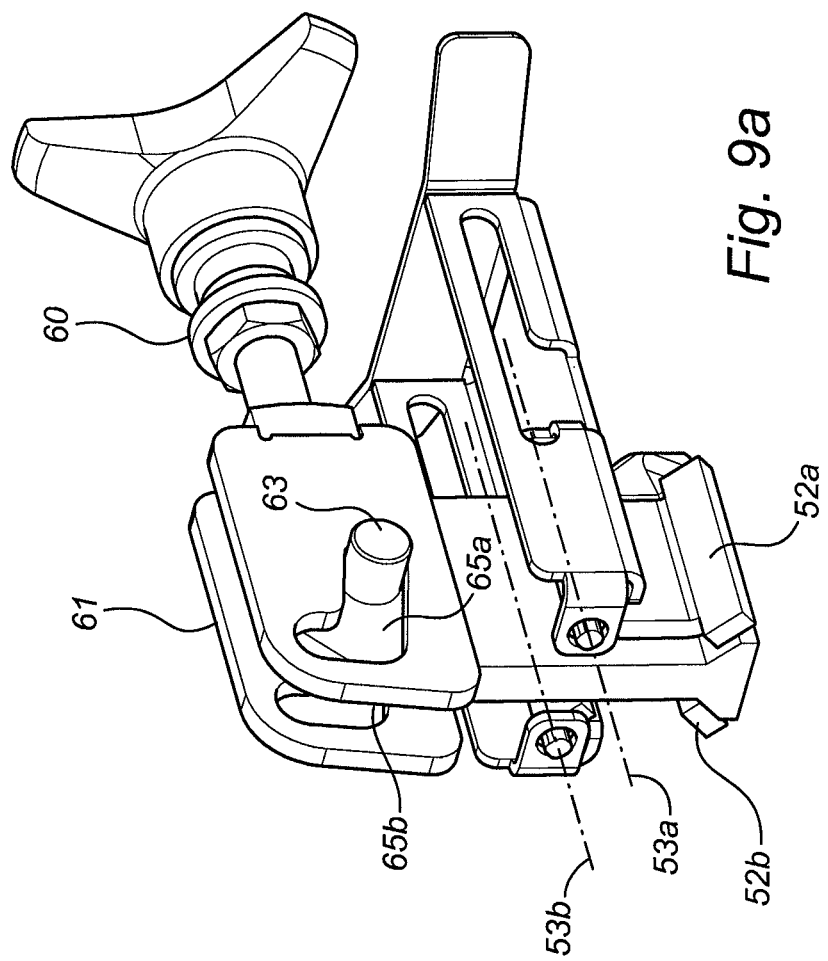
Figure 9B:
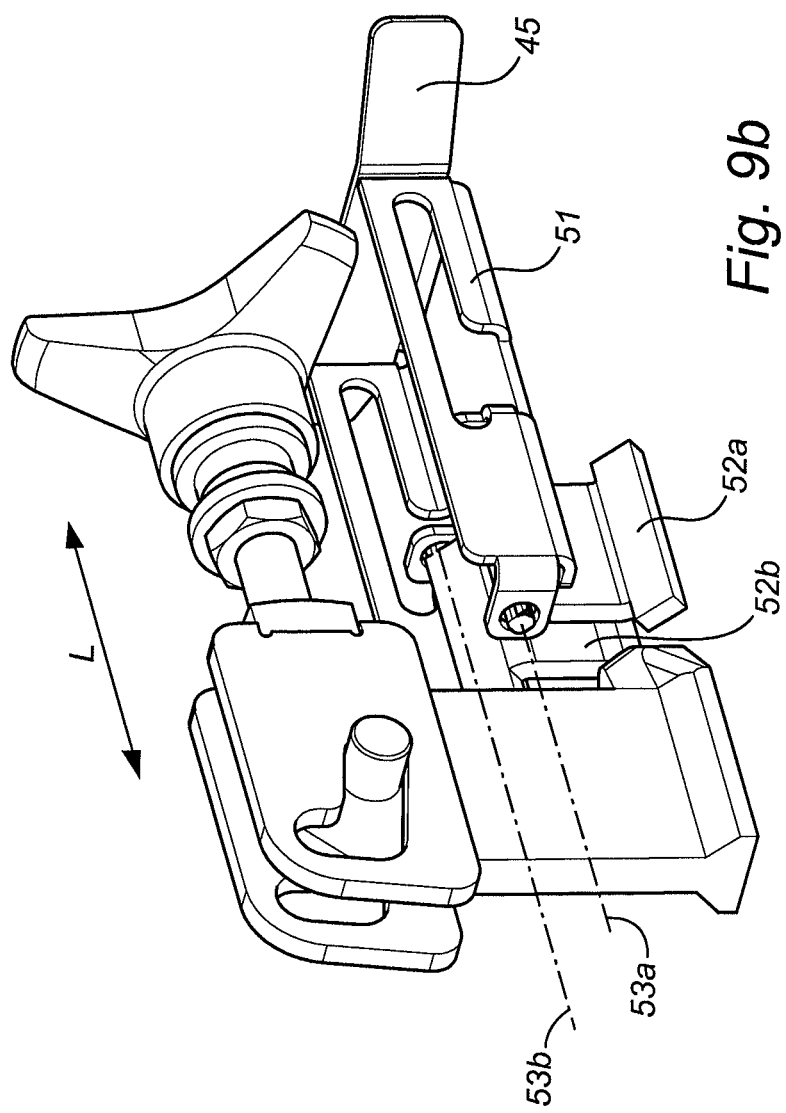
Figure 10A:
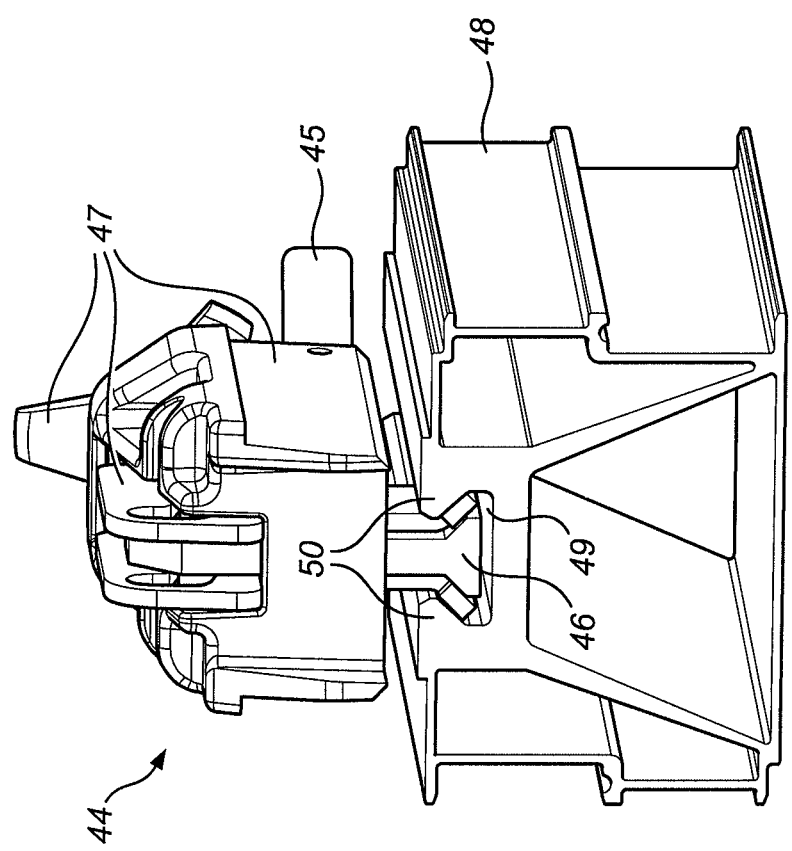
Figure 10B:
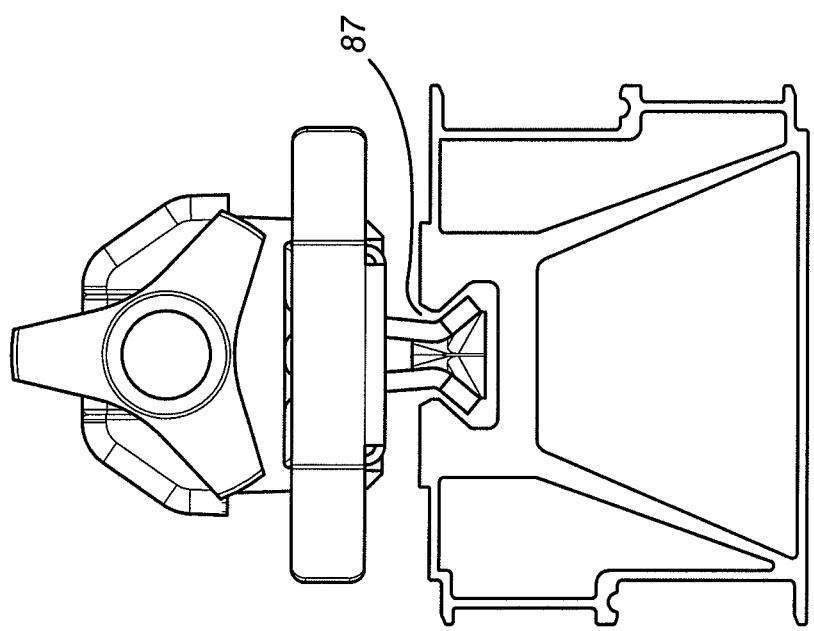
Figure 11A:
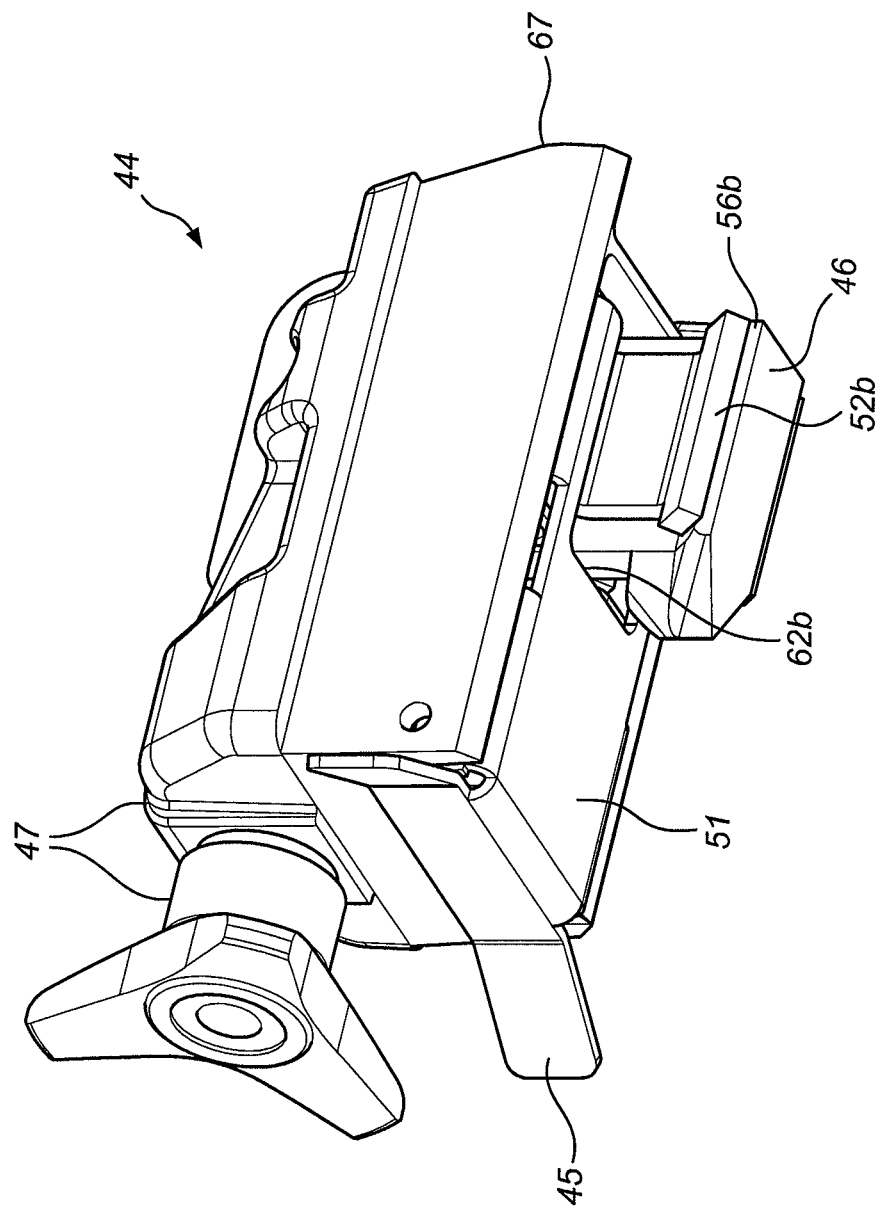
Figure 11B:
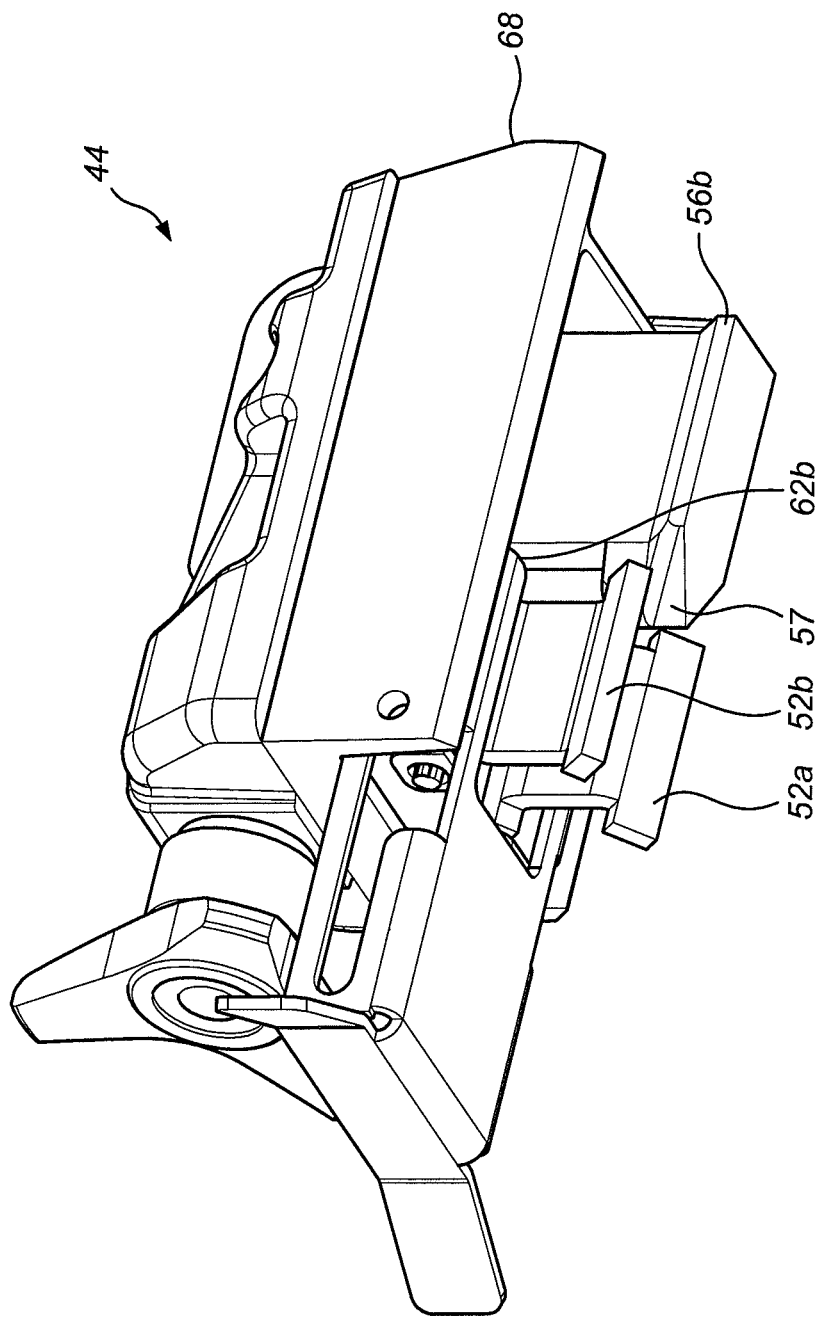

The arm blocking (14) and locking (13) means are better shown in FIG. 3. In this embodiment, the arm blocking means comprise protrusion (15) mounted on the rigid arm and introduced in slit (16), and the end of slit (14a) as indicated on FIG. 3. The arm locking means (13) comprise protrusion (15) introduced in slit (16), and the holes (17) in the foot support into which at least one ball plunger fits which is mounted on the front side of the rigid arm, and which is not shown in FIG. 3 as it is located behind the upper part of the foot support.

FIGS. 4a-6d show an embodiment of the device (1) comprising a foldable chair in an unfolded position (FIGS. 4a-4d), in a seating position (FIGS. 5a-5d) and in a folded position (FIGS. 6a-6d), and this from different perspectives. The foldable chair (19) comprises a seat element (20) which is mounted on the foot support (3) with chair attachment means (21). The chair (19) also comprises a back support, attached to the seat element (20) with back attachment means (23). The proximal side of the chair (24) is the side nearest to the rigid arm when the chair is in unfolded position. In FIGS. 4a-6d, the proximal side (24) is the right side of the chair for a person sitting in it. The distal side of the chair (25) is then the left side of the chair, which is the side furthest away from the rigid arm when the chair is in an unfolded and seating position. The chair attachment means (21) comprise a seat hinge (26) which defines a first axis (27) which lies along an essentially longitudinal direction (L) around which the seat element (20) can rotate. Also shown are attachment points (28a) and (28b) where a mechanical actuator such as a gasspring can be attached to the seat element (20) and to the foot support (3). In FIG. 4d, one can see that the line between these two attachment points is eccentrical from the first axis (27), i.e. this line crosses instead of cuts the axis (27). A mechanical actuator such as a gasspring can be chosen such that it applies a force outwards, i.e. tending to apply a force upwards in seat attachment point (28a) and downwards in foot support attachment point (28b). Hereby, the mechanical actuator keeps the seat in an unfolded/seating position. When the seat is being folded, the mechanical actuator is first pushed inwards and then pulled outwards again, i.e. the distance between points (28a) and (28b) first decreases, reaches a minimum at a certain moment when the seat is in between a seating position and a folded position, and then increases again. Thus, when the seat is folded, the mechanical actuator keeps the seat in a folded position by applying a force on the seat element opposite to the force needed to unfold the seat element.

The foot support comprises a bent part (30) onto which the seat element (20) is mounted with a seat hinge (26). The bent part (30) comprises an upstanding portion with a profile which fits the profile of the bottom of the seat element (20) and which prevents the seat element (20) from rotating beyond the folded position.

Figure 14A:
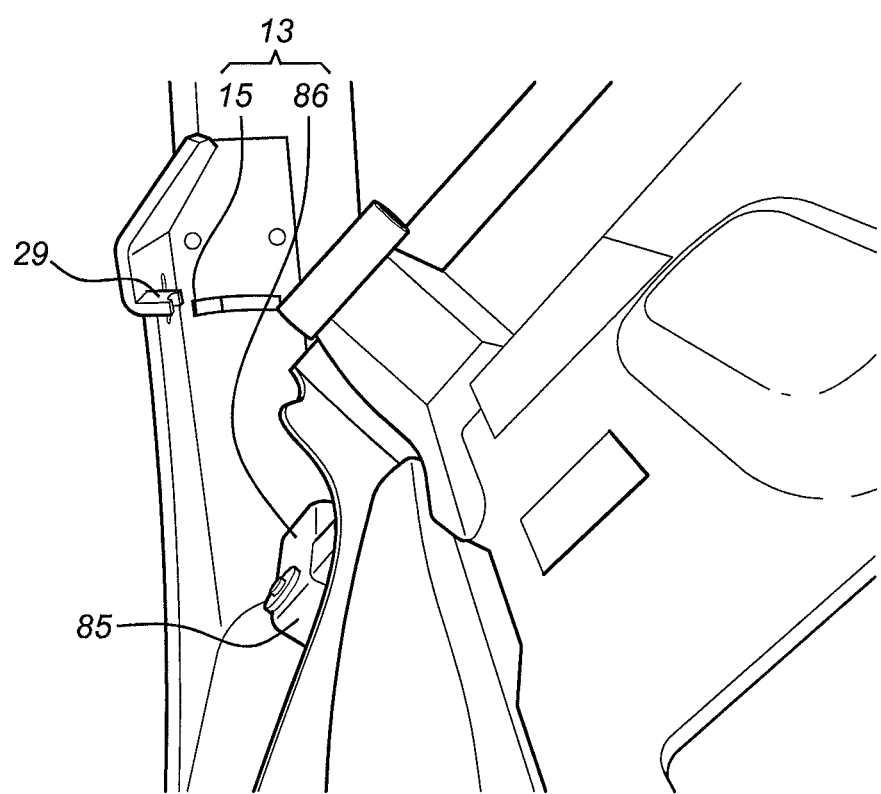
FIGS. 14a-14b show seat blocking elements and arm locking elements mounted on the seat element, rigid arm and foot support.
Figure 14B:
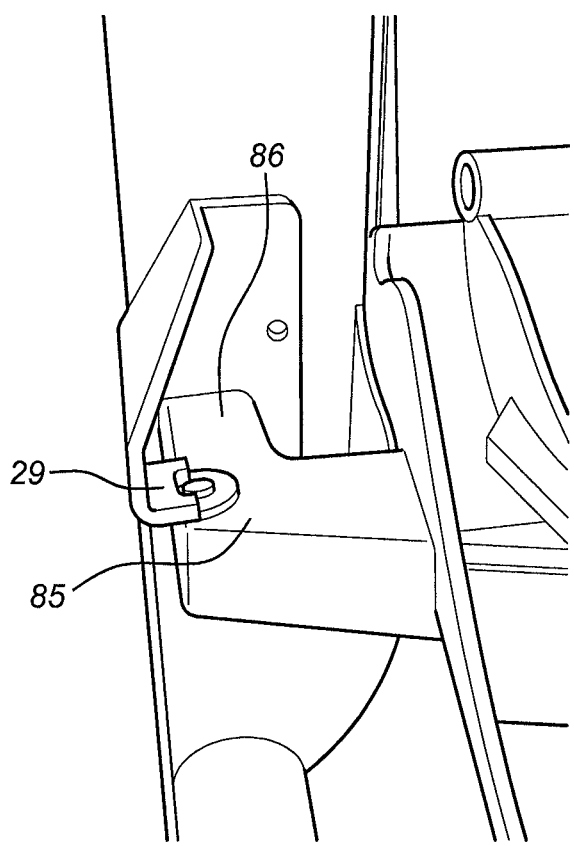

In order for the seat to not move beyond a seating position when being unfolded, a first seat blocking element (29) is attached to the foot support, as shown in e.g. FIGS. 1a, 14a and 14b. A second seat blocking element (85) is mounted on the seat. Also shown on FIGS. 14a and 14b is the arm locking element (86) attached to the seat element which engages with the protrusion (15) mounted on the foot support such that the rigid arm remains in an essentially upright position when the chair is in a seating or unfolded position. In FIGS. 14a, 14b, the arm locking element (86) and the second seat blocking element (85) comprise edges of the same L-shaped component attached to the seat element.

In FIGS. 4a-6d, the back support (22) is attached to the seat element (20) by means of back hinges (31) defining a second axis (32) in an essentially transverse horizontal direction (TH) when the chair is in a seating or unfolded position. The back attachment means (23) also comprise a seating lock mechanism (33) which locks and unlocks the back support in a seating position with a ballpoint-like mechanism, i.e. when folding the back support on the seat element, one extra push locks the back support in a seating position, and when the back support is folded in a seating position, one extra push unlocks the back support.

The chair as shown in FIGS. 4a-6d comprises a head support (34) attached to the back support (22) by means of two bars (35) which can slide through sliding means (36) between an extended position (37) and a bottom position (38) in which the head support is slidden partly into and partly over the back support (22).

Figure 2C:
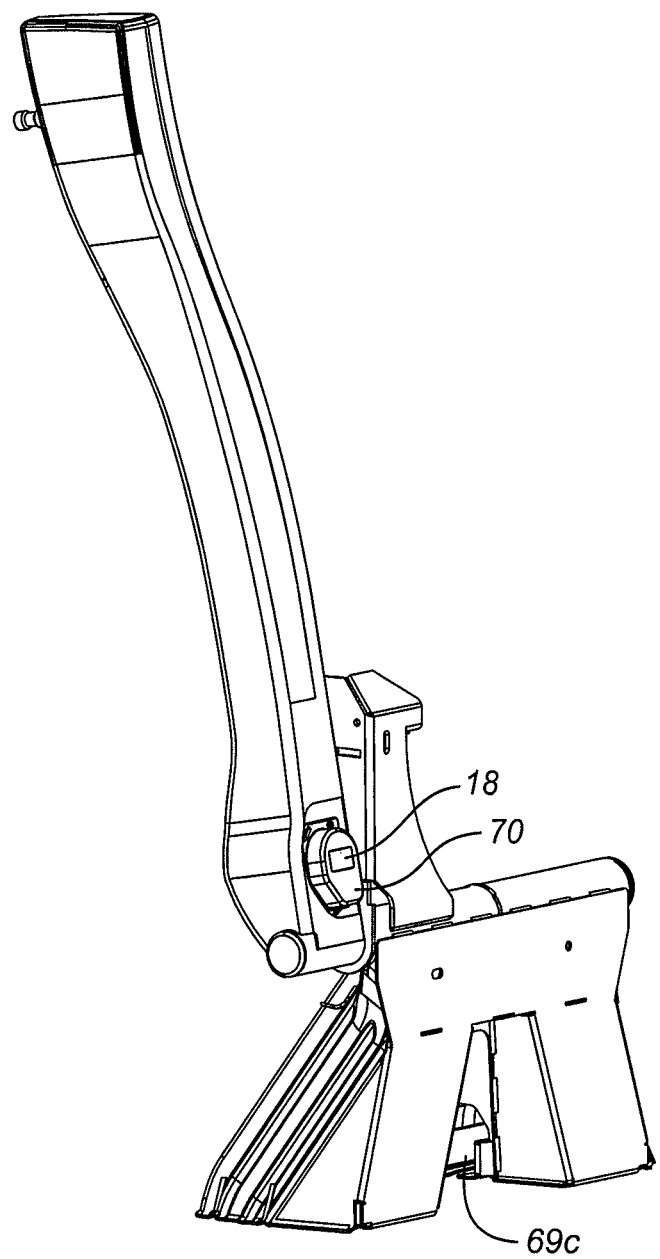

The back support (22) can be locked into an unfolded position by a back support locking mechanism (39), comprising a protrusion (40) on the rigid arm as shown in FIGS. 2a, 2b, 2c, and a gripping element (82) attached to the back support in region (41). The gripping element (82) is better shown in FIGS. 13a-13d and comprises a pawl (80) and a latch (83). In this case, the protrusion (40) acts as a striker (84) in a pawl-latch-striker lock. One of the bars (35) of the head support (34) makes contact with a force transfer mechanism (75), in this case a lever (77)-and-rod (76) system, when the head support (34) is pushed beyond the bottom position (38). The rod (76) is connected at its top end (78) to the pawl (80) and relaxes the pawl, thereby unlocking the back support locking mechanism (39), when being pushed upwards by the lever (77). The back support (22) also comprises a double-O shaped spring (81), the ends of which engage with grooves in the bars (35) of the head support (34). Hereby the spring (81) is able to keep the head support (34) in pre-determined positions, among which an extended position (37) and a bottom position (38). When the head support is pushed downwards beyond the bottom position (38), e.g. for unlocking the back support locking mechanism, the spring (81) is also able to pull back the head support into the bottom position.

In FIGS. 5a-6d, a handle (42) is shown which is attached to the back support at the distal side of the chair. When the chair is in an unfolded, seating or folded position, this handle may support an able person to walk along the chair or to get up after bending e.g. after fixing or unfixing a wheelchair, and this handle may also support a disabled person when moving through the vehicle. Also shown is the side profile (43) of the rigid arm (2) which fits the proximal side (24) profile of the back support (22). FIGS. 7-11b show an embodiment of a connector and its parts according to the present document. A connector (44) comprises a sledge (45), a T-bolt-like profiled clamping member (46) and a clamping actuator (47) placed on the sledge (45). By inserting the T-bolt-like profiled clamping member (46) in between two profiled plates (52a, 52b) of the sledge (45) and lifting it with the clamping actuator (47), the connector is clamped on a rail (48) of the vehicle floor (74 in FIG. 12). The rail (48) comprises a U-shaped lateral cross section (49) with overhanging edges (50) and, in this case, lies along an essentially longitudinal direction. The sledge (45) comprises a sledge frame (51) and two profiled plates (52a, 52b), each of which can rotate around its respective pivot axis (53a, 53b) fixed with respect to the sledge frame (51). The T-bolt-like profiled clamping member (46) comprises a slab-like upper part (54), a flatiron-like lower part (55) which comprises essentially straight sides (56a, 56b), a peak-shaped back end (57), and upstanding, slanted side faces (58). The clamping actuator (47) comprises a spindle frame (59), a spindle (60) and a lifting frame (61). The T-bolt-like profiled clamping member (46) is introduced into an essentially rectangular hole (62) at the bottom of the spindle frame (59) and is refrained from moving in the longitudinal direction by the front side (62a) and the back side (62b) of the hole (62). The T-bolt-like profiled clamping member (46) is connected to the lifting frame (61) by a cylindrical pivot bar (63) which is introduced through a hole (64) in the upper part (54) of the T-bolt-like profiled clamping member (46) and through two slanted slits (65a, 65b) in the lifting frame (61). The lifting frame is capable of moving along a longitudinal groove (66) in the spindle frame (59) when the spindle (60) is turned. The bottom of the spindle frame (59) fits into the sledge frame (51) and can slide between a locking position (67) in which the T-bolt-like profiled clamping member (46) is introduced in between the two profiled plates (52a, 52b), and an open position (68) in which the T-bolt-like profiled clamping member (46) is not positioned in between the two profiled plates (52a, 52b).

In order to lock the connector (44) to the rail (48), the connector is placed in the open position (68). The lower part (55) of the T-bolt-like profiled clamping member (46) and the freely-hanging profiled plates (52a, 52b) are introduced through the longitudinal slit (87) at the top of the rail. The clamping actuator (47) and T-bolt-like profiled clamping member (46) are then slidden with respect to the sledge (45) such that the lower part (55) of the T-bolt-like profiled clamping member (46) is introduced between the two profiled plates (52a, 52b) and the connector is in a locking position (67). As such, the connector (44) cannot be detached from the rail (48), but can still slide along the rail since it is not completely clamped. For clamping the connector (44) to the rail (48), the spindle (60) needs to be turned. This way, the lifting frame (61) moves in a longitudinal direction such that the T-bolt-like profiled clamping member (46) is lifted due to the slanted slits (65a, 65b) to which it is connected via the pivot bar (63). By turning the spindle (60) far enough, the connector (44) is clamped to the rail (48). Loosening of the connector (44) can be done by turning the spindle in the opposite way and following the above mentioned steps in reverse. The connector (44) may be connected to the bottom of the foot support (3) of the device (1) and/or may clamp an essentially horizontal protrusion mounted on the bottom of the foot support between the bottom of the spindle frame (59) and the top side of the overhanging edges (50) of the rail and/or the floor (48). In an embodiment, the outer shape of the spindle frame (69a) fits a hole (69b) in the foot support (3). The outer shape of the spindle frame (69a) of a second connector may fit a second hole (69c) in the foot support (3).

Figure 12:
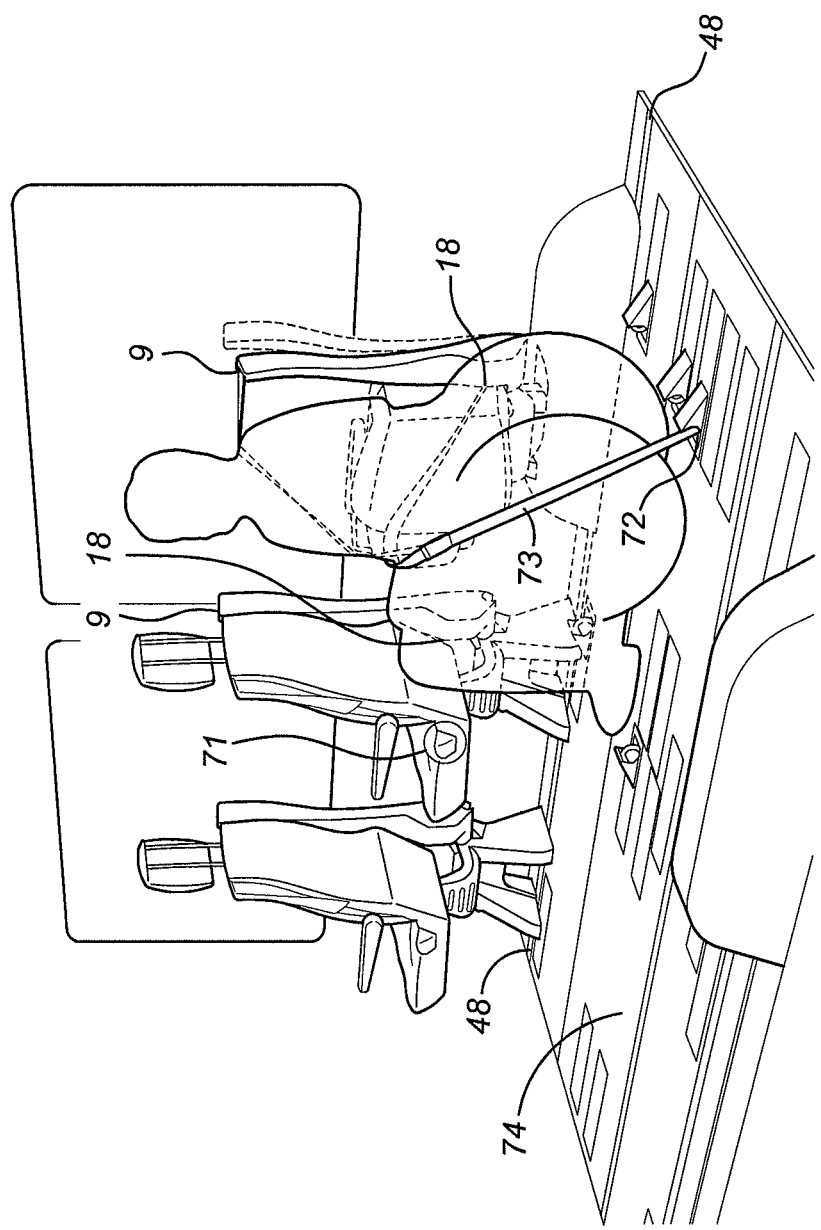
FIG. 12 shows an overview of the interior of a transport vehicle where three devices are installed on the vehicle floor via a rail.
Figure 13A:
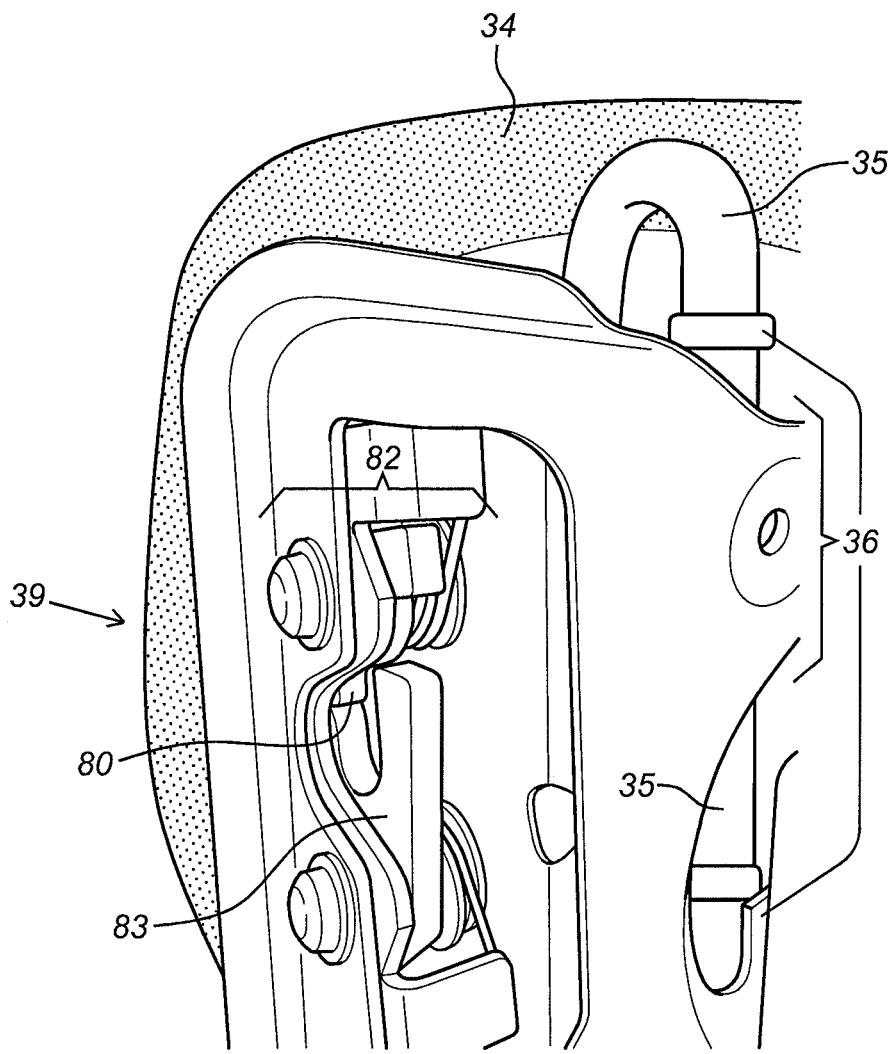
FIGS. 13a-13d show a gripping element attached to the back support, comprising a pawl and a latch, according to an embodiment of the invention.
Figure 13B:
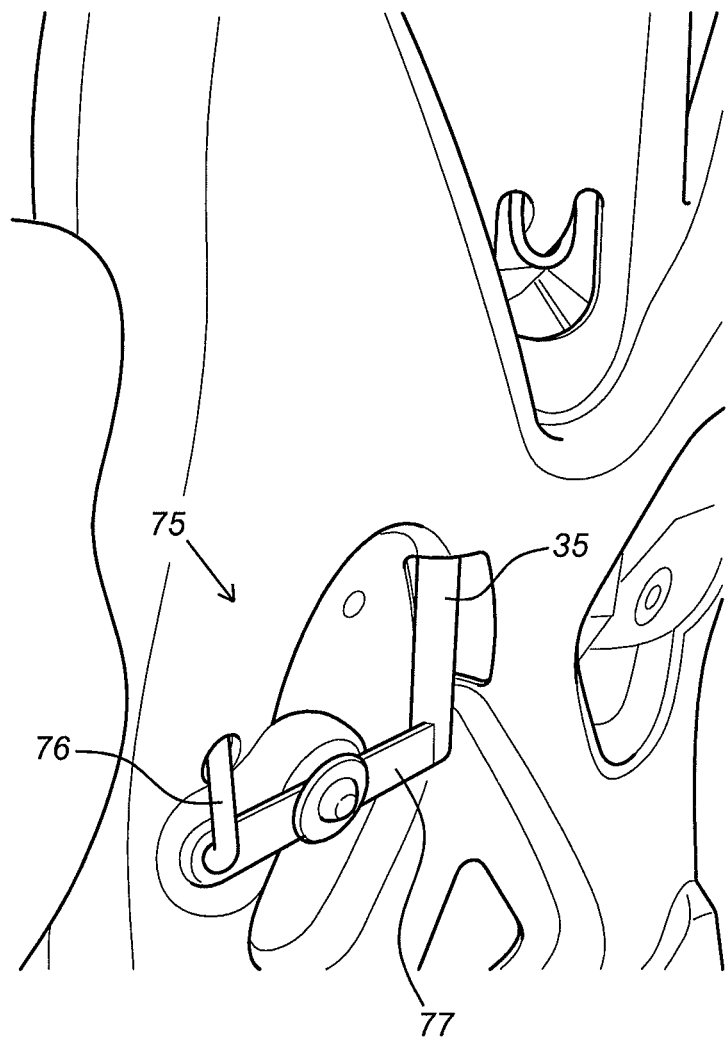
Figure 13C:
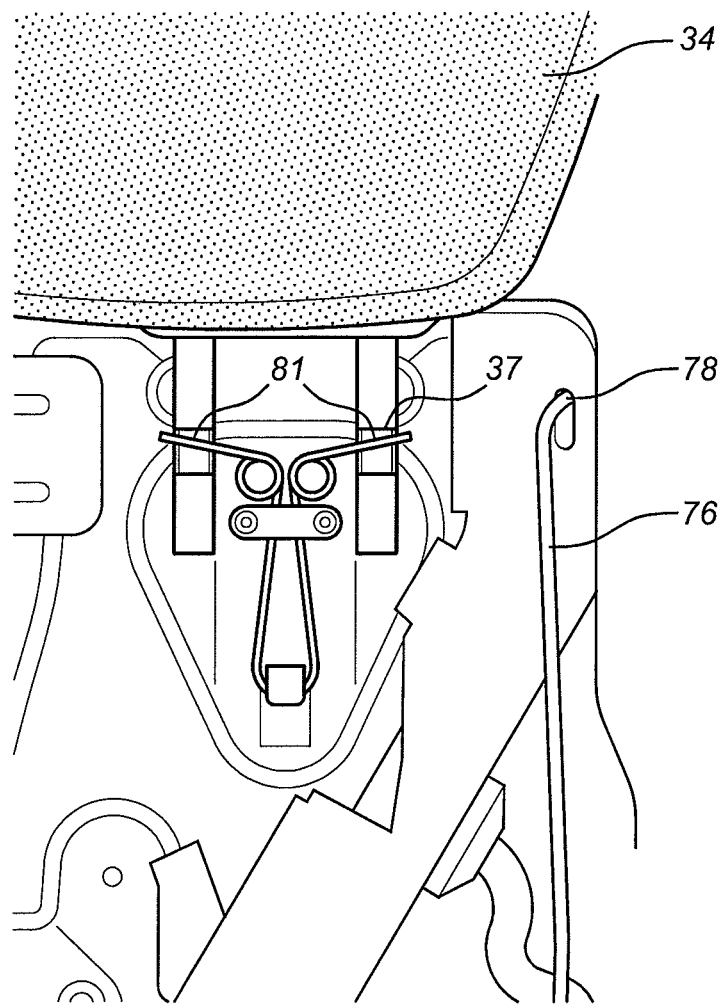
Figure 13D:
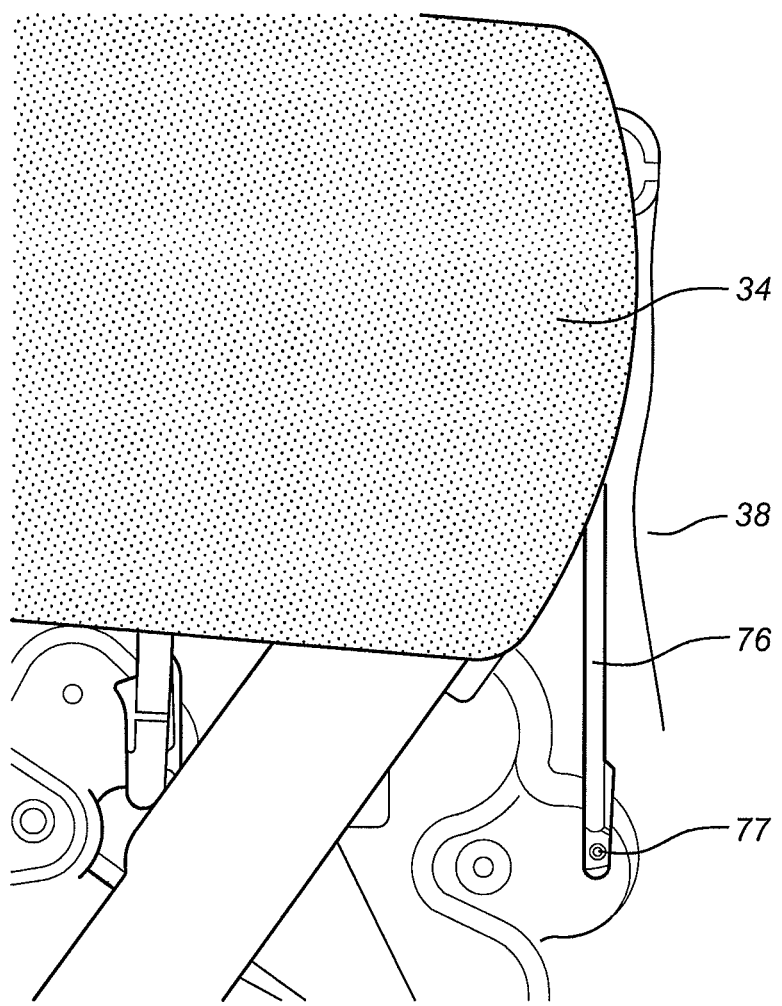

FIG. 12 shows an overview of the interior of a transport vehicle where three devices are installed on the vehicle floor (74) via a rail (48). The chairs of two of the devices are unfolded and provided seats for able passengers. The chair of one device is folded and space is made available for a wheelchair passenger. It should be noted that the chair is foldable in such a way, i.e. first the back support is folded on top of the seat element and then the seat element is turned, that the view of the wheelchair passenger through the window is unblocked. Able passengers can be secured in the first two seats by a three-point safety-belt system with a first (9), a second (18) and a third (71) attachment point. A retractor (70) can be attached to the second attachment point (18) and a buckle can be attached to the third attachment point (71). The wheelchair passenger may be secured in his wheelchair by the same three-point safety-belt system as could be used by an able passenger occupying the third chair if it were unfolded, but now with a first (9), a second (18) and a fourth (72) attachment point. A buckle, stored in a space in the floor, can be attached to the fourth attachment point (72).

It is supposed that the present invention is not restricted to any form of realization described previously and that some modifications can be added to the presented example of fabrication without reappraisal of the appended claims.

What is claimed is:

1. A device suitable for use in a transport vehicle of able people and people in a wheelchair, comprising:
a foot support comprising foot attachment means for attachment to a vehicle floor;
a rigid arm having a shoulder end and a foot end, said rigid arm connected near said foot end to said foot support;
a safety-belt system comprising a safety-belt and safety-belt attachment means, wherein said safety-belt attachment means comprise a first attachment point with belt-guiding means, said first attachment point being situated near the shoulder end of said rigid arm,
wherein said rigid arm is attached to said foot support by means of one or more arm hinges, wherein said rigid arm is capable of rotating around said arm hinges, wherein said arm hinges define an axis around which said rigid arm is capable of rotating between an essentially upright position and a tilted position when said rigid arm is unlocked for adjusting a position of the first attachment point of the safety-belt system in height and horizontal displacement for the safety and comfort of wheelchair passengers, the device comprising a foldable chair comprising a seat element attached to said foot support with chair attachment means, and a back support attached to said seat element with back attachment means, said chair capable of being folded between an unfolded position suitable for transport of an able person and a folded position suitable for transport of a person in a wheelchair, wherein said chair in said unfolded position comprises a proximal side near said rigid arm in said essentially upright position and an opposite distal side, wherein said foldable chair further comprises a head support, a second locking mechanism and a third locking mechanism,
wherein said chair attachment means comprise one or more seat hinges and a mechanical actuator for holding the seat element in either said folded position or in a seating position said seat hinges defining a first axis around which said seat element is capable of rotating with respect to said foot support between a seating position and a folded position;
wherein said back support is connected to said seat element by means of one or more back hinges; said back hinges defining a second axis around which said back support is capable of rotating when it is unlocked between said seating position and said unfolded position; and
wherein said first axis and said second axis are mutually perpendicular and not in the same plane situated.

2. The device according to claim 1, comprising arm blocking means defining a maximum tilting angle between said essentially upright position and said tilted position, wherein said maximum tilting angle is smaller than 45° and larger than 1°.

3. The device according to claim 1, further comprising arm locking means for fixing said rigid arm in an essentially upright position.

4. The device according to claim 1,
wherein said first axis lies essentially horizontal and along the proximal side of the chair;
wherein the chair comprises a seating lock mechanism for locking the back support in a position where the back support is folded onto the seat element;
wherein the device comprises a back support locking mechanism for fixing the back support in an unfolded position;
wherein the chair comprises a head support comprising one or more bars, which is connected to said back support by means of said bars which can slide along sliding means attached to said back support, and wherein said head support can slide between an extended position and a bottom position; and
wherein the chair comprises a transfer mechanism capable of transferring a force from the head support to the back support locking mechanism for unlocking the back support from said unfolded position.

5. The device according to claim 1, wherein the rigid arm comprises a shape which is wider in the longitudinal direction with respect to the vehicle in which the device can be installed near said foot end than near said shoulder end.

6. The device according to claim 1, further comprising a connector for attaching said foot support to a vehicle floor.

7. A system comprising a device according to claim 6 and a floor comprising a rail in an essentially longitudinal direction, wherein the connector of said device is capable of connecting the foot support to said floor along said rail.

8. A method for transporting one or more able passengers, one or more disabled passengers, or a combination of both able and disabled passengers comprising loading said passengers onto a system according to claim 7.

9. The device according to claim 6, wherein the connector comprises a sledge, a T-bolt-like profiled clamping member and a clamping actuator,
- wherein the clamping actuator is placed on the sledge and is capable of lifting the T-bolt-like profiled clamping member such that the connector is clamped with the T-bolt-like profiled clamping member to the vehicle floor,
- wherein the sledge comprises a frame and two profiled plates, each of which is capable of rotating around a preferably essentially longitudinal pivot axis which is fixed with respect to the frame;
- wherein the T-bolt-like profiled clamping member comprises a slab-like upper part and a flatiron-like lower part comprising essentially straight side edges and a peak-shaped back end, wherein the lower part of said T-bolt-like profiled clamping member comprises upstanding side faces which are at least partly slanted with respect to sides of the slab-like upper part of said T-bolt-like profiled clamping member;
- wherein the clamping actuator comprises a spindle, a spindle frame and a lifting frame, wherein the slab-like upper part of the T-bolt-like profiled clamping member is introduced through an essentially rectangular hole in the bottom of the spindle frame, wherein preferably the T-bolt-like profiled clamping member is restrained from moving in the longitudinal direction by front or back side of a hole in the bottom of the spindle frame; and
- wherein the T-bolt-like profiled clamping member is attached to the lifting frame, preferably by an essentially cylindrical pivot bar wherein the pivot bar is inserted in a transverse hole through an upper end of the slab-like upper part of the T-bolt-like profiled clamping member and rests in slanted slits along sides of the lifting frame, wherein the lifting frame is capable of moving along the longitudinal direction with respect to the spindle frame and the spindle is introduced through the spindle frame and the lifting frame in a longitudinal direction such that turning the spindle results in a longitudinal movement of the lifting frame with respect to the spindle frame, thereby moving said pivot bar upwards or downwards since it follows the slanted slits in sides of the lifting frame.

10. The device according to claim 1, wherein said safety-belt attachment means comprise a second attachment point near said foot end of said rigid arm at the proximal side of the foldable chair, wherein said safety-belt attachment means comprise a third attachment point, situated at the distal side of said seat element, wherein a first fastening counterpart is connected to said third attachment point of said safety-belt attachment means.

11. The device according to claim 10, wherein said safety-belt attachment means comprise a fourth attachment point, connected to said vehicle floor, wherein a second fastening counterpart is connected to said fourth attachment point.

12. A method for transporting one or more able passengers, one or more disabled passengers, or a combination of both able and disabled passengers comprising loading said passengers onto a device according to claim 1.

13. The device according to claim 1, wherein the rigid arm comprises a shape which is wider in the longitudinal direction with respect to the vehicle in which the device can be installed near said arm hinges than near said shoulder end.

14. A device suitable for use in a transport vehicle of able people and people in a wheelchair, comprising:
- a foot support comprising foot attachment means for attachment to a vehicle floor;
- a rigid arm having a shoulder end and a foot end, said rigid arm connected near said foot end to said foot support;
- a safety-belt system comprising a safety-belt and safety-belt attachment means, wherein said safety-belt attachment means comprise a first attachment point with belt-guiding means said first attachment point being situated near the shoulder end of said rigid arm,
- wherein said rigid arm is attached to said foot support by means of one or more arm hinges, wherein said rigid arm is capable of rotating around said arm hinges wherein said arm hinges define an axis around which said rigid arm is ca s able of rotating between an essentially upright position and a tilted position when said rigid arm is unlocked for adjusting a position of the first attachment point of the safety-belt in height and horizontal displacement for the safety and comfort of wheelchair passengers, the device further comprising a connector for attaching said foot support to a vehicle floor, wherein the connector comprises a sledge, a T-bolt-like profiled clamping member and a clamping actuator
- wherein the clamping actuator is placed on the sledge and is capable of lifting the T-bolt-like profiled clamping member such that the connector is clamped with the T-bolt-like profiled clamping member to the vehicle floor;
- wherein the sledge comprises a frame and two profiled plates, each of which is capable of rotating around a preferably essentially longitudinal pivot axis which is fixed with respect to the frame;
- wherein the T-bolt-like profiled clamping member comprises a slab-like upper part and a flatiron-like lower part comprising essentially straight side edges and a peak-shaped front end, wherein the lower part of said T-bolt-like profiled clamping member comprises upstanding side faces which are at least partly slanted with respect to sides of the slab-like upper part of said T-bolt-like profiled clamping member;
- wherein the clamping actuator comprises a spindle, a spindle frame and a lifting frame, wherein the slab-like upper part of the T-bolt-like profiled clamping member is introduced through an essentially rectangular hole in the bottom of the spindle frame, wherein preferably the T-bolt-like profiled clamping member is restrained from moving in the longitudinal direction by front or back side of a hole in the bottom of the spindle frame; and
- wherein the T-bolt-like profiled clamping member is attached to the lifting frame, preferably by an essentially cylindrical pivot bar wherein the pivot bar is inserted in a transverse hole through an upper end of the slab-like upper part of the T-bolt-like profiled clamping member and rests in slanted slits along sides of the lifting frame, wherein the lifting frame is capable of moving along the longitudinal direction with respect to the spindle frame and the spindle is introduced through the spindle frame and the lifting frame in a longitudinal direction such that turning the spindle results in a longitudinal movement of the lifting frame with respect to the spindle frame, thereby moving said pivot bar upwards or downwards since it follows the slanted slits in sides of the lifting frame.

15. A system comprising a device according to claim 14, and a floor comprising a rail in an essentially longitudinal direction, wherein the connector of said device is capable of connecting the foot support to said floor along said rail.

16. A method for transporting one or more able passengers, one or more disabled passengers, or a combination of both able and disabled passengers comprising loading said passengers onto a system according to claim 15.

\* \* \* \* \*